US012616218B2

(12) United States Patent
Wang et al.

(10) Patent No.: US 12,616,218 B2
(45) Date of Patent: May 5, 2026

(54) BREAST MILK STRUCTURED LIPID SIMULATING THE COMPOSITION OF TRIGLYCERIDES AND METHOD FOR PREPARING THE SAME

(71) Applicant: Kerisom Food Biotechnology Enterprises Limited, Taizhou City (CN)

(72) Inventors: Qin Wang, Taizhou City (CN); Danqiong Wu, Taizhou City (CN); Yawen Jiang, Taizhou City (CN); Xiaoqiang Zou, Taizhou City (CN); Zhonghao Chao, Taizhou City (CN); Yao Yang, Taizhou City (CN)

( * ) Notice: Subject to any disclaimer, the term of this patent is extended or adjusted under 35 U.S.C. 154(b) by 278 days.

(21) Appl. No.: 18/361,578

(22) Filed: Jul. 28, 2023

(65) Prior Publication Data

US 2024/0032555 A1 Feb. 1, 2024

(30) Foreign Application Priority Data

Jul. 29, 2022 (CN) .......................... 202210912025.3

(51) Int. Cl.
*A23C 9/152* (2006.01)
*A23C 11/04* (2025.01)
*A23D 9/04* (2006.01)

(52) U.S. Cl.
CPC ............ *A23C 9/1528* (2013.01); *A23C 11/04* (2013.01); *A23D 9/04* (2013.01)

(58) Field of Classification Search
CPC .......... A23C 9/1528; A23C 11/04; A23D 9/04
USPC ....................................................... 426/330.3
See application file for complete search history.

(56) References Cited

FOREIGN PATENT DOCUMENTS

| | | | | | |
|---|---|---|---|---|---|
| CN | 102845537 | A | * | 1/2013 | |
| CN | 104186701 | A | * | 12/2014 | |
| CN | 104855542 | B | * | 10/2018 | ............... A23D 9/04 |
| CN | 105028659 | B | * | 10/2018 | |
| CN | 113575696 | A | * | 11/2021 | ............. G16C 20/30 |
| CN | 113575697 | A | * | 11/2021 | ............... A23L 5/25 |
| CN | 113584095 | A | * | 11/2021 | ............... G16B 5/00 |
| JP | H 8509630 | | * | 10/1996 | |

OTHER PUBLICATIONS

Translation for CN 113575696 (Year: 2021).*
Translation CN 102845537 (Year: 2013).*
Translation CN 104186701 (Year: 2014).*
Translation CN 104855542 (Year: 2018).*
Translation CN 105028659 (Year: 2018).*
Translation CN 113575697 (Year: 2021).*
Translation CN 113584095 (Year: 2021).*
Translation JP H 8509620 (Year: 1996).*

* cited by examiner

*Primary Examiner* — Jennifer McNeil

(57) ABSTRACT

The present invention provides a breast milk structured lipid simulating the composition of triglycerides and the method for preparing the same. The breast milk structured lipid exhibits a similarity of over 90% to breast milk lipid, including the contents of less than 0.3 mg/kg of esterified propenyl glycerol, less than 0.5 mg/kg of chloropropanol esters, and less than 0.3 g/100 g of trans fatty acids. The final product of the present invention exhibits a composition highly similar to breast milk while also meeting the requirements of the national food safety standard GB30604-2015.

7 Claims, No Drawings

BREAST MILK STRUCTURED LIPID SIMULATING THE COMPOSITION OF TRIGLYCERIDES AND METHOD FOR PREPARING THE SAME

CROSS-REFERENCES TO RELATED APPLICATIONS

This application claims priority from Chinese patent application number 2022109120253 filed on Jul. 29, 2022; the disclosure of which is incorporated herein by reference in its entirety.

FIELD OF THE INVENTION

The present invention relates to the technical field of oil and lipid. More specifically, the present invention relates to a breast milk structured lipid that mimics the composition of triglycerides, and the method for preparing the same.

BACKGROUND OF THE INVENTION

Breast milk lipid is the primary source of energy for infants when they are breastfed, accounting for over 50% of the total energy intake. Additionally, it provides active substances such as fat-soluble vitamins and polyunsaturated fatty acids, which are crucial for the health, development, and growth of the infants. Triglycerides are the predominant substance in breast milk lipid, constituting over 98% of its content. They possess unique fatty acid composition and molecular structures, which vary depending on the lactation stage, the mother's dietary habits, individual circumstances, and genetic characteristics. The major fatty acids (present in amounts greater than 1%) found in breast milk lipid include oleic acid, palmitic acid, linoleic acid, stearic acid, myristic acid, lauric acid, linolenic acid, and decanoic acid, in which over 60% of palmitic acid is located at the sn-2 position, while the majority of unsaturated fatty acids are primarily found at the sn-1,3. The composition of triglyceride of breast milk lipid is rather complex, and based on its fatty acid distribution, it can be inferred that one of the major types of triglycerides in breast milk lipid is 1,3-diunsaturated fatty acid-2-palmitic acid triglyceride (UPU). The triglycerides with this specific structure may enhance the absorption of fats and calcium, and they also influence the metabolism of triglycerides within the infant's body. The composition and content of the triglycerides in breast milk lipid are the result of long-term evolution. Due to underdeveloped growth, infants have a different digestive and metabolic environment compared to adults. Among these differences, the gastric lipase activity in infants is similar to that of adults, but the concentration of pancreatic lipase is only 5-10% of that in adults, and the bile salt content is less than 50%. Meanwhile, the enzymatic activity of fatty acid desaturases and elongases in infants is also lower. Therefore, the composition of triglycerides in lipids is closely related to the digestion, absorption, and metabolism in infants.

Infant formula is a substitute for breast milk lipid, and its composition is based on breast milk as the gold standard. It is primarily made from cow's milk (or goat's milk) and its processed products, and processed by adjusting the levels of protein, lipid, and other components, along with adding appropriate amounts of vitamins, minerals, and other additives. When the infants are temporarily unable to receive breastfeeding, the infant formula becomes the best alternative food for them. Infant formula typically contains around 25% lipid content, serving as a primary source of energy and functional lipids for infants, just like breast milk lipid does. Currently, the lipid mainly used to modulate the lipid structure in formula milk is 1,3-diacylglycerol-2-palmitic acid triglyceride (OPO). By adding this structured lipid, the lipid composition in formula milk can achieve a certain level of similarity to breast milk lipid in terms of fatty acid distribution. However, due to the complexity of triglycerides in breast milk lipid, the enhancement of similarity in the triglyceride composition of formula milk lipid is limited. In the current industrial production processes, due to the relatively low content of OPO, it is challenging to meet the requirements of both national food safety standard GB30604-2015 "Food Nutrition Fortifier 1,3-diacylglycerol-2-palmitic acid triglyceride" and the composition of breast milk lipid simultaneously. Considering the unique physiological environment of infants and their specific digestion, absorption, and metabolic processes of triglycerides, a new process that utilizes triglyceride composition to produce a product that meets both the requirements of the national food safety standard GB30604-2015 and also satisfies the composition demands of breast milk lipid.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

The present invention is made in view of the technical problems of breast milk structured lipid as above-mentioned.

Therefore, one of the objectives of the present invention is to overcome the shortcomings in the products of breast milk structured lipid and provide a breast milk structured lipid simulating the composition of triglycerides. The breast milk structured lipid exhibits a similarity of over 90% to breast milk lipid, including the contents of less than 0.3 mg/kg of esterified propenyl glycerol, less than 0.5 mg/kg of chloropropanol esters, and less than 0.3 g/100 g of trans fatty acids.

Another aspect of the present is to providing a method for preparing the breast milk structured lipid that mimics the composition of triglycerides.

To solve the technical problems as above-mentioned, in accordance with one aspect of the present invention, the present invention provides the following solutions: a preparation method of the breast milk structured lipid that mimics the composition of triglycerides, including the following steps: evaluating the content of palmitic acid in an acidolysis reaction product and the amount of the acidolysis reaction product to be extracted based on characteristics of a composition of breast milk lipid; determining a range of required sn-2 fatty acid composition during a lipid blending process and a range of required sn-1,3 fatty acid composition during an acidolysis reaction, and establishing a lipid blending model to determine a proportion of lipid addition, establishing an acidolysis equilibrium model to determine a composition of free fatty acids required for the acidolysis reaction under different substrate ratios, and establishing a fatty acid blending model to determine the proportions of fatty acids from different lipid sources; performing the acidolysis reaction between a palm stearin catalyzed by a sn-1,3 lipase and blended fatty acids; adjusting the content of triglyceride palmitic acid in the acidolysis reaction product via fractionation and extraction under a condition of containing free fatty acids, and removing partial glyceride after the completion of the acidolysis reaction, and a substitute lipid product with a high similarity to the breast milk lipid in terms of the fatty acid composition and distribution, as well as the triglyceride composition is obtained after removing the fatty acids via vacuum distillation. The lipid blending model is as follows:

$$sn\text{-}2\ FA\ \% = \frac{Y_{i(sn\text{-}2)} + \sum_{i=2}^{n} Y_{i(sn\text{-}2)} X_i}{1 + \sum_{i=2}^{n} X_i}, \tag{1}$$

where "sn-2 FA %" is sn-2 fatty acid composition in mixed lipids, "Y" represents different fatty acids, "$Y_{1(sn\text{-}2)}$" and "$Y_{i(sn\text{-}2)}$" are molar percentages of each fatty acid at sn-2 position of the selected palm stearin and the lipids, respectively, "$X_i$" represents a molar ratio of the lipid to the palm stearin. As a result, the total fatty acids and sn-1,3 fatty acid composition can also be obtained, as shown below:

$$FA\ \% = \frac{Y_i + \sum_{i=2}^{n} Y_i X_i}{1 + \sum_{i=2}^{n} X_i}, \tag{2}$$

$$sn\text{-}1,3\ FA\ \% = \frac{3 \times \left(Y_1 + \sum_{i=2}^{n} Y_i X\right) - \left(Y_{i(sn\text{-}2)} + \sum_{i=2}^{n} Y_{i(sn\text{-}2)} X_i\right)}{2 \times \left(1 + \sum_{i=2}^{n} X_i\right)}, \tag{3}$$

where "FA %" is the fatty acid composition in the mixed lipids, "sn-1,3 FA %" is the sn-1,3 fatty acid composition in the mixed lipids, "$Y_1$" and "$Y_i$" represent the molar percentage of each fatty acid in palm stearin and the selected lipids, respectively. The acidolysis equilibrium model is as follows:
the content of Xi fatty acids in the triglycerides sn-1,3 (sn-1/3Xi) at reaction equilibrium is as follows:

$$sn\text{-}1/3\ FA\ \% = \frac{2mM_{sn\text{-}1/3Xi} + hM_{Xi}}{\sum_{i=1}^{n} (2mM_{sn\text{-}1/3Xi} + hM_{Xi})}, \tag{4}$$

wherein m is the amount of the triglycerides, h is the amount of the fatty acids, n is the type of the fatty acids, $X_i$ represents different fatty acids, $M_{sn\text{-}1/\text{-}3Xi}$ is a molar percentage of Xi fatty acids on a sn-1,3 position of triglycerides, $M_{Xi}$ is a molar percentage of free fatty acids Xi;
since $$\sum_{i=1}^{n} M_{sn\text{-}2Xi} = 1, \sum_{i=1}^{n} M_{Xi} = 1, \text{ and therefore}$$

$$\sum_{i=1}^{n} (2mM_{sn\text{-}1/3Xi} + hM_{Xi}) = 2m + h,$$

and the acidolysis equilibrium model is further simplified as:

$$sn\text{-}1/3\ FA\ \% = \frac{2mM_{sn\text{-}1/3Xi} + hM_{Xi}}{2m + h}, \tag{5}$$

if h/m=S, a molar ratio between the free fatty acids to the triglycerides is S:1, and the content of Xi fatty acids in the triglycerides sn-1,3 at reaction equilibrium is further simplified as:

$$sn\text{-}1/3\ FA\ \% = \frac{2M_{sn\text{-}1/3Xi} + SM_{Xi}}{2 + S}, \tag{6}$$

wherein the fatty acid blending model is as follows:

$$FA\ \% = \frac{\sum_{i=2}^{n} Y_i X_i}{\sum_{i=2}^{n} X_i}, \tag{7}$$

wherein $Y_i$ is a molar percentage of each fatty acid in the selected lipids, and $X_i$ is a molar ratio of the selected lipids.

As a preferred method for preparing breast milk structured lipid simulating a composition of triglycerides, wherein the amount of palmitic acid to be fractionated and extracted from the acidolysis reaction product using the palm stearin as a raw material is determined by performing a pre-reaction based on characteristics of the composition of breast milk lipid.

As a preferred method for preparing breast milk structured lipid simulating a composition of triglycerides, wherein an acidolysis product of the palm stearin has a maximum removal amount of palmitic acid of 15-25%.

As a preferred method for preparing breast milk structured lipid simulating a composition of triglycerides, wherein an edible vegetable oil is selected to regulate the sn-2 fatty acid composition of the palm stearin based on a reference range of the sn-2 fatty acid composition, the edible vegetable oil is selected from a group consisting of sunflower oil, soybean oil, tea seed oil, coconut oil, palm kernel oil, and flaxseed oil.

As a preferred method for preparing breast milk structured lipid simulating a composition of triglycerides, wherein a fatty acid proportion is calculated based on a fatty acid balance from the acidolysis reaction of the lipids, and one or more of the fatty acids from sunflower seed oil, rapeseed oil, coconut oil, flaxseed oil, tea seed oil, and palm kernel oil are selected as acyl donors for the acidolysis reaction, and the type and proportion of the acyl donors are determined by establishing a fatty acid mixing model of the lipids.

As a preferred method for preparing breast milk structured lipid simulating a composition of triglycerides, wherein the product is obtained by catalyzing the acidolysis reaction of the palm stearin with mixed fatty acids using a sn-1,3 specific lipase via a packed bed or batch reactor, and the sn-1,3 specific lipase comprises one or more of Lipzyme RM IM, Lipzyme TL IM, Lipase DF, NS 40086.

As a preferred method for preparing breast milk structured lipid simulating a composition of triglycerides, by using a procedure containing free fatty acids, the triglycerides with higher saturation levels are fractionate and removed from enzymatic hydrolysis products, and partial glycerides are eliminated, and the obtained liquid oil triglycerides have palmitic acid content within a range of the breast milk lipid.

As a preferred method for preparing breast milk structured lipid simulating a composition of triglycerides, wherein a first stage comprises heating the lipid to 60-70° C. for 20-45 minutes, and reducing the lipid to 26-35° C. at the rate of 5-15° C./h for 2-8 hours, so that the palmitic acid and tripalmitin crystallize and form crystal nucleus.

As a preferred method for preparing breast milk structured lipid simulating a composition of triglycerides, wherein a second stage comprises reducing the lipid to 13-24° C. at the rate of 4-10° C./h and keeping for 4-12 hours to facilitate crystallization of partial glycerides containing two palmitic acids.

Therefore, the present invention employs a systematic analysis of breast milk lipid composition to pre-evaluate the palmitic acid content in the acidolysis product and the amount of palmitic acid that needs to be fractionated and extracted from the acidolysis product. It determines a range of required sn-2 fatty acid composition during a lipid blending process and a range of required sn-1,3 fatty acid composition during an acidolysis reaction, and establishing a lipid blending model to determine a proportion of lipid addition, establishing an acidolysis equilibrium model to determine a composition of free fatty acids required for the acidolysis reaction under different substrate ratios, and establishing a fatty acid blending model to determine the proportions of fatty acids from different lipid sources, performing the acidolysis reaction between a palm stearin catalyzed by a sn-1,3 lipase and blended fatty acids, adjusting the content of triglyceride palmitic acid in the acidolysis reaction product via fractionation and extraction under a condition of containing free fatty acids, and removing partial glyceride after the completion of the acidolysis reaction, and a substitute lipid product with a high similarity to the breast milk lipid in terms of the fatty acid composition and distribution, as well as the triglyceride composition is obtained after removing the fatty acids via vacuum distillation, and the content of harmful substances such as glycidyl esters and chloropropanol esters is low. Meanwhile, both the production process and product indicators meet the requirements of both national food safety standard GB30604-2015 "Food Nutrition Fortifier 1,3-diacylglycerol-2-palmitic acid triglyceride" and the composition of breast milk lipid simultaneously.

DETAILED DESCRIPTION

To make the above-mentioned objectives, features and advantages more easily be understood, the following detailed description of the embodiments of the present invention is provided in conjunction with the specification.

Although the following descriptions illustrate in detail in order to facilitate understanding of the present invention, it should be understood by a skilled person in the art that the present invention can also be enabled by other ways not described herein. The skilled person in the art can also implement the present invention without departing from the spirit of the present invention such that the following descriptions concerning the examples will not limit the present invention.

In addition, the expressions "an embodiment" or "an example" used herein refers to including specific features, structure and characteristics of at least one embodiment of the present invention. "According to an embodiment of the present invention" appears in the present disclosure does not necessarily mean that it refers to the same embodiment, or it does not necessarily mean that it independently or selectively contradicts with one another.

The detection method for C52 triglycerides is carried out according to the method specified in the national food safety standard GB30604-2015, "Food Nutrient Fortifiers-1,3-diacylglycerol-2-palmitic acid triglyceride".

EXAMPLES

Example 1

The various fatty acid contents in breast milk lipid were determined, and the results of the measurements were recorded in Table 1 and Table 2.

TABLE 1

| The content ranges of fatty acids, sn-2 fatty acids, and sn-1,3 fatty acids in breast milk lipid | | | | | | |
|---|---|---|---|---|---|---|
| Fatty acid | Total | | sn-2 | | sn-1,3 | |
| (mol %) | min | max | min | max | min | max |
| C6:0 | 0.01 | 0.12 | 0.01 | 0.11 | 0.01 | 0.18 |
| C8:0 | 0.06 | 0.92 | 0.03 | 1.08 | 0.08 | 1.43 |
| C10:0 | 0.08 | 2.82 | 0.36 | 1.62 | 0.11 | 3.48 |
| C12:0 | 1.21 | 8.95 | 1.95 | 13.69 | 1.94 | 10.56 |
| C14:0 | 2.03 | 9.84 | 3.29 | 18.55 | 3.88 | 7.21 |
| C16:0 | 13.83 | 29.77 | 37.02 | 66.33 | 3.49 | 12.66 |
| C18:0 | 2.55 | 9.17 | 1.18 | 3.43 | 2.09 | 12.73 |
| C18:1ω-9 | 25.61 | 37.42 | 5.41 | 23.27 | 30.64 | 52.74 |
| C18:2ω-6 | 14.96 | 27.84 | 2.59 | 17.4 | 16.79 | 39.81 |
| C18:3 ω-3 | 1.06 | 2.25 | 0.55 | 2.78 | 1.13 | 2.19 |

TABLE 2

| The composition of triglycerides in breast milk lipid (%) | | |
|---|---|---|
| TAG | min | max |
| CaLaLa | 0.02 | 1.33 |
| BuOP | 0.00 | 1.05 |
| MLaCa | 0.00 | 0.94 |
| CaLaL | 0.01 | 0.69 |
| CaLaO | 0.00 | 2.73 |
| LaLaM | 0.05 | 2.05 |
| LaLaO | 0.07 | 3.74 |
| CaPL | 0.22 | 9.10 |
| LLL | 0.5 | 3.93 |
| LaOL | 0.01 | 10.23 |
| CaPO | 1.12 | 10.00 |
| OLL | 0.81 | 13.79 |
| PLL | 2.03 | 15.02 |
| MOL | 1.27 | 16.19 |
| LaOO | 0.29 | 4.29 |
| POLa | 3.38 | 12.11 |
| POL | 15.17 | 31.32 |
| PPL | 1.45 | 7.12 |
| MPO | 0.61 | 3.35 |
| OOO | 0.95 | 2.82 |
| POO | 5.69 | 30.42 |
| PPO | 1.12 | 8.91 |
| SOO | 0.04 | 4.13 |
| POS | 0.05 | 6.23 |
| PPS | 0.18 | 1.38 |

Example 2

Palm stearin with a palmitic acid content of 82.4% and sn-2 palmitic acid content of 73.5% was chosen as the starting material. The fatty acid composition and distribution of palm stearin were shown in Table 3.

TABLE 3

The fatty acid characteristics of palm stearin

| Fatty acid | Palm stearin | | |
|---|---|---|---|
| (mol%) | Total | sn-2 | sn-1,3 |
| C14:0 | 1 | 0.3 | 1.4 |
| C16:0 | 82.4 | 75.5 | 85.9 |
| C18:0 | 3.9 | 3.3 | 4.2 |
| C18:1ω-9 | 10.1 | 16.8 | 6.8 |
| C18:2ω-6 | 2.6 | 4.1 | 1.9 |

The acidolysis reaction was a reversible ester exchange reaction. During the reaction, palmitic acid at the sn-1,3 positions of palm stearin participated in the reaction and was replaced by other fatty acids. However, due to the reversibility of the acidolysis reaction, the substituted palmitic acid could also undergo esterification at the sn-1,3 positions. Thus, the reaction product also contained triglycerides with higher saturation levels after the reaction was completed. Due to the high melting points of these triglycerides, they were difficult to be absorbed after ingestion by infants and young children. Therefore, they had to be removed from the reaction product. Additionally, since the starting material contained a high amount of palmitic acid, the total palmitic acid content in the product after the reaction exceeded that of breast milk lipid. Therefore, to ensure that the palmitic acid content fell within the range of breast milk lipid, fractionation of the acid-hydrolyzed lipid was required after the reaction to achieve the desired palmitic acid content in line with breast milk lipid.

Oleic acid was utilized as the acyl donor in the reaction. In this example, the selected palm stearin was used as the raw material, and acidolysis reactions were conducted under substrate ratios of 1:8, 1:10, 1:12, and 1:14 (palm stearin: fatty acid, mol/mol). The reaction was carried out at a temperature of 60° C. for 10 hours with an enzyme dosage of 10%. The content of palmitic acid in the system after the reaction was detected, and the results were shown in Table 4.

TABLE 4

The palmitic acid content in the reaction product after acidolysis under different substrate molar ratios

| Substrate ratio | 1:8 | 1:10 | 1:12 | 1:14 |
|---|---|---|---|---|
| Palmitic acid (mol %) | 50.3% | 46.6% | 41.3% | 36.2% |

After comparison, the lipids were mixed based one the subsequent removal of up to 20% of palmitic acid to meet the required palmitic acid content in breast milk lipid. That is, after the reaction was completed and saturated triglycerides were removed through fractionation and extraction, the sn-2 fatty acid content in the system remained within the range found in breast milk lipid. Therefore, based on the increase of 20% in palmitic acid content in sn-2 fatty acids of breast milk lipid and the decrease of 20% in the content of other fatty acids excluding palmitic acid, the blending of palm stearin was conducted, and the obtained ranges were shown in Table 5.

TABLE 5

The reference range for sn-2 fatty acid mixture

| Fatty acid | sn-2 | |
|---|---|---|
| (mol %) | min | max |
| C6:0 | 0.01 | 0.09 |
| C8:0 | 0.02 | 0.86 |
| C10:0 | 0.29 | 1.30 |
| C12:0 | 1.56 | 10.95 |
| C14:0 | 2.63 | 14.84 |
| C16:0 | 44.42 | 79.60 |
| C18:0 | 0.94 | 2.74 |
| C18:1ω-9 | 4.33 | 18.62 |
| C18:2ω-6 | 2.07 | 13.92 |
| C18:3 ω-3 | 0.44 | 2.22 |

Compared to the obtained range of sn-2 fatty acids, palm stearin lacked medium-chain fatty acids at the sn-2 position, such as C6:0, C8:0, C10:0, and C12:0, with lower content of C14:0 and relatively lower content of C18:2, and it did not contain C18:3. Therefore, palm kernel oil rich in medium-chain fatty acids, sunflower seed oil rich in linoleic acid, tea seed oil rich in oleic acid, and flaxseed oil rich in linolenic acid were chosen to regulate the composition of sn-2 fatty acids in palm stearin, aligning it within the range found in breast milk lipid. The required amount of lipids was calculated and predicted through the establishment of a model of sn-2 fatty acid composition in the mixed fats. Based on the fatty acid composition and distribution of the lipids, the calculation model for the sn-2 fatty acid composition of the lipids was established as follows:

$$sn-2FA \% = \frac{Y_{1(sn-2)} + \sum_{i=2}^{n} Y_{i(sn-2)}X_i}{1 + \sum_{i=2}^{n} X_i}, \tag{1}$$

where "sn-2 FA %" referred to the sn-2 fatty acid composition in the mixed lipids; "Y" represented different fatty acids; "$Y_{1(sn-2)}$" and "$Y_{i\ (sn-2)}$" were the molar percentages of each fatty acid at the sn-2 position of palm stearin and the selected lipids, respectively; "$X_i$" represented the molar ratio of the selected lipid to palm stearin. As a result, the total fatty acids and sn-1,3 fatty acid composition could also be obtained, as shown below:

$$FA \% = \frac{Y_1 + \sum_{i=2}^{n} Y_i X_i}{1 + \sum_{i=2}^{n} X_i}, \tag{2}$$

$$sn-1,3FA \% = \frac{3 \times \left(Y_1 + \sum_{i=2}^{n} Y_i X_i\right) - \left(Y_{1(sn-2)} + \sum_{i=2}^{n} Y_{i(sn-2)}X_i\right)}{2 \times \left(1 + \sum_{i=2}^{n} X_i\right)}, \tag{3}$$

where "FA %" referred to the fatty acid composition in the mixed lipids; "sn-1,3 FA %" referred to the sn-1,3 fatty acid composition in the mixed lipids; "$Y_1$" and "$Y_i$" represent the molar percentage of each fatty acid in palm stearin and the selected lipids, respectively.

By setting "$X_i$", the fatty acid composition and distribution in the mixed system could be calculated using the above formulas. Based on the reference range for mixing sn-2 fatty acids, inequalities could be established to calculate the allowable range of each lipid addition within the reference range. Finally, the total fatty acid composition and sn-1,3 fatty acid composition could be calculated according to formulas 2 and 3.

meeting the sn-2 fatty acid composition of breast milk lipid, a lower proportion of external lipid were chosen for blending.

That is, the ratio of palm stearin to sunflower seed oil to tea seed oil to palm kernel oil to flaxseed oil was 1:0.02:0.02:0.18:0.03. The fatty acid composition and distribution of the obtained mixed lipids were shown in Table 7.

TABLE 6

The fatty acid characteristics of the selected mixed lipids

| Fatty acid (mol %) | Sunflower oil X1 | | | Rapeseed oil X2 | | | Coconut oil X3 | | | Flaxseed oil X4 | | |
|---|---|---|---|---|---|---|---|---|---|---|---|---|
| | Total | sn-2 | sn-1,3 | Total | sn-2 | sn-1,3 | Total | sn-2 | sn-1,3 | Total | sn-2 | sn-1,3 |
| C6:0 | | | | | | | 0.62 | 0.57 | 0.65 | | | |
| C8:0 | | | | | | | 5.71 | 1.43 | 7.85 | | | |
| C10:0 | | | | | | | 5.56 | 3.46 | 6.61 | | | |
| C12:0 | | | | | | | 47.12 | 76.42 | 32.47 | | | |
| C14:0 | | | | | | | 19.3 | 9.35 | 24.28 | | | |
| C16:0 | 6.53 | 4.62 | 7.49 | 8.72 | 5.18 | 10.49 | 9.92 | 3.01 | 13.38 | 5.32 | 5.18 | 5.39 |
| C18:0 | 3.44 | 2.42 | 3.95 | 3.68 | 2.11 | 4.47 | 3 | 0.87 | 4.07 | 3.66 | 2.38 | 4.3 |
| C18:1 | 31.25 | 22.8 | 35.48 | 65.71 | 52.65 | 72.24 | 7.03 | 3.62 | 8.74 | 19.45 | 31.7 | 13.33 |
| C18:2 | 58.78 | 70.16 | 53.09 | 21.89 | 40.06 | 12.81 | 1.74 | 1.27 | 1.98 | 16.23 | 27.46 | 10.62 |
| C18:3 | | | | | | | | | | 54.3 | 33.28 | 64.81 |

Sunflower oil was set as X1, tea seed oil was set as X2, coconut oil was set as X3, and flaxseed oil was set as X4. Based on the composition of sn-2 fatty acids in breast milk lipid, an inequality was established using a mixing model, as shown below.

$0.01 \leq 0.57X3/(1+X1+X2+X3+X4) \leq 0.09$    Sn-2 C6:0

$0.02 \leq 1.43X3/(1+X1+X2+X3+X4) \leq 0.86$    sn-2 C8:0

$0.29 \leq 3.46X3/(1+X1+X2+X3+X4) \leq 1.30$    sn-2C10:0

$1.56 \leq 76.42X3/(1+X1+X2+X3+X4) \leq 10.95$    sn-2C12:0

$2.63 \leq (0.3+9.35X3)/(1+X1+X2+X3+X4) \leq 14.84$    sn-2C14:0

$44.42 \leq (75.5+4.62X1+5.18X2+3.01X3+5.18X4)/(1+X1+X2+X3+X4) \leq 79.60$    sn-2C16:0

$0.94 \leq (3.3+2.42X1+2.11X2+0.87X3+2.38X4)/(1+X1+X2+X3+X4) \leq 2.74$    sn-2C18:0

$4.33 \leq (16.8+22.8X1+52.65X2+3.62X3+31.7X4)/(1+X1+X2+X3+X4) \leq 18.62$    sn-2C18:1

$2.07 \leq (4.1+70.16X1+40.06X2+1.27X3+27.46X4)/(1+X1+X2+X3+X4) \leq 13.92$    sn-2 C18:2

$0.44 \leq 33.28X4/(1+X1+X2+X3+X4) \leq 2.22$    sn-2 C18:3

Through solving the inequality, it could be determined that when the ratio of palm stearin to sunflower seed oil, rapeseed oil, palm kernel oil, and flaxseed oil was 1:(0-0.1):(0-0.1):(0.15-0.2):(0.02-0.1), the sn-2 fatty acids of the mixed lipids primarily fell within the composition range of sn-2 fatty acids found in breast milk lipid. In order to achieve higher sn-2 palmitic acid content in the mixed lipids while

TABLE 7

The fatty acid characteristics of the mixed lipids

| Fatty acid (mol %) | Total | sn-2 | sn-1,3 |
|---|---|---|---|
| C6:0 | 0.09 | 0.08 | 0.09 |
| C8:0 | 0.82 | 0.21 | 1.13 |
| C10:0 | 0.80 | 0.50 | 0.95 |
| C12:0 | 6.79 | 11.00 | 4.68 |
| C14:0 | 3.61 | 1.59 | 4.62 |
| C16:0 | 67.75 | 61.11 | 71.06 |
| C18:0 | 3.75 | 2.89 | 4.18 |
| C18:1ω-9 | 11.14 | 15.93 | 8.74 |
| C18:2ω-6 | 4.04 | 5.89 | 3.11 |
| C18:3 ω-3 | 1.30 | 0.80 | 1.56 |

The sn-2 fatty acids of the mixed lipids fell within the reference range. However, concerning the composition of sn-1,3 fatty acids, the mixed lipids had a higher content of palmitic acid and lower content of oleic acid and linoleic acid. Therefore, the sn-1,3 fatty acid composition of the mixed lipids was regulated by selecting acyl donors and utilizing acidolysis reaction catalyzed by sn-1,3 lipase.

Based on the sn-1,3 fatty acid composition of breast milk lipid, an acidolysis fatty acid equilibrium model was established to predict the substrate ratios and the proportions of free fatty acids that would meet the sn-1,3 fatty acid composition of breast milk lipid. However, as previously shown, the separation of saturated triglycerides from the lipid system after the reaction was completed had an impact on the composition of sn-1,3 fatty acids in the lipids. Therefore, taking into account the 20% palmitic acid in the separated system, if the sn-1,3 fatty acid composition of the product needs to be within the range of breast milk lipid, the first step is to reduce the content of other fatty acids in sn-1,3 position of breast milk lipid by 20%, excluding palmitic acid. Then, the palmitic acid content in the sn-1,3 position should be increased by 20%. The reference range of the resulting sn-1,3 fatty acid composition was shown in Table 8.

TABLE 8

| Reference concentration range for sn-1,3 fatty acid mixtures | | |
|---|---|---|
| Fatty acid | sn-1,3 | |
| (mol %) | min | max |
| C6:0 | 0.01 | 0.14 |
| C8:0 | 0.06 | 1.14 |
| C10:0 | 0.09 | 2.78 |
| C12:0 | 1.55 | 8.45 |
| C14:0 | 3.10 | 5.77 |
| C16:0 | 4.19 | 15.19 |
| C18:0 | 1.67 | 10.18 |
| C18:1ω-9 | 24.51 | 42.19 |
| C18:2ω-6 | 13.43 | 31.85 |
| C18:3 ω-3 | 0.90 | 1.75 |

Firstly, by establishing an acidolysis fatty acid equilibrium prediction model for the lipids, the substrate ratios and fatty acid proportions required to achieve the reference range were calculated. In the reaction system, the content of triglycerides was denoted as "m", and the content of fatty acids was denoted as "h". During the reaction process, the used lipase was sn-1,3 position-specific, and the fatty acids at the sn-1,3 position followed a random distribution. In the entire reaction system, the types of fatty acids were defined as "n", and different fatty acids were denoted as "$X_i$". By controlling the reaction conditions to regulate acyl transfer, the change in sn-2 fatty acids was relatively small. Therefore, the variation in sn-2 fatty acids was neglected. In the system, the fatty acids involved in the reaction were primarily sn-1,3 fatty acids of triglycerides and the added free fatty acids. For individual fatty acid $X_i$, the molar percentage of $X_i$ fatty acid at the sn-1,3 position of triglycerides was represented as $M_{sn-1}/-3X_i$, and the molar percentage of free fatty acid $X_i$ was represented as $M_{Xi}$. Therefore, when the system reached reaction equilibrium, according to the principle of random distribution, the content of fatty acid Xi at the sn-1,3 position of triglycerides (sn-1/3$X_i$) was represented as follows:

$$sn - 1/3FA\ \% = \frac{2mM_{sn-1/3Xi} + hM_{Xi}}{\sum_{i=1}^{n}(2mM_{sn-1/3Xi} + hM_{Xi})},\qquad(4)$$

$$\text{since } \sum_{i=1}^{n} M_{sn-2Xi} = 1,$$

$$\sum_{i=1}^{n} M_{Xi} = 1, \text{ and therefore}$$

$$\sum_{i=1}^{n}(2mM_{sn-1/3Xi} + hM_{Xi}) = 2m + h,$$

and the acidolysis equilibrium model was further simplified as:

$$sn - 1/3FA\ \% = \frac{2mM_{sn-1/3Xi} + hM_{Xi}}{2m + h},\qquad(5)$$

if h/m=S, a molar ratio between the free fatty acids to the triglycerides is S:1, and the content of Xi fatty acids in the sn-1,3 of triglycerides at reaction equilibrium was further simplified as:

$$sn - 1/3FA\ \% = \frac{2M_{sn-1/3Xi} + SM_{Xi}}{2 + S},\qquad(6)$$

wherein "$M_{sn-1}/-3X_i$" represented the molar percentage of fatty acid Xi at the sn-1,3 position of triglycerides; "$M_{Xi}$" represented the molar percentage of free fatty acid $X_i$; "S" represented the molar ratio of free fatty acids to triglycerides. Based on the sn-1,3 fatty acid composition of the mixed lipids, it was possible to calculate the theoretical content of different fatty acids at the sn-1,3 position after reaching equilibrium in the acidolysis reaction.

Using the acidolysis fatty acid equilibrium model, it was possible to calculate the proportions of free fatty acids required to achieve the reference range of sn-1,3 fatty acids in breast milk lipid for different substrate ratios, as shown in Table 9.

TABLE 9

| The theoretical values of the various fatty acids required to achieve the reference range of sn-1,3 fatty acids | | | | |
|---|---|---|---|---|
| | Reference range sn-1,3 | | Mixed lipids | Theoretical values obtained from |
| Fatty acid | | | | |
| (mol %) | min | max | sn-1,3 | acidolysis |
| C6:0 | 0.01 | 0.14 | 0.09 | $(0.09 \times 2 + M_{X1}S)/(S + 2)$ |
| C8:0 | 0.06 | 1.14 | 1.13 | $(1.13 \times 2 + M_{X2}S)/(S + 2)$ |
| C10:0 | 0.09 | 2.78 | 0.95 | $(0.95 \times 2 + M_{X3}S)/(S + 2)$ |
| C12:0 | 1.55 | 8.45 | 4.68 | $(4.68 \times 2 + M_{X4}S)/(S + 2)$ |
| C14:0 | 3.10 | 5.77 | 4.62 | $(4.62 \times 2 + M_{X5}S)/(S + 2)$ |
| C16:0 | 4.19 | 15.19 | 71.06 | $(71.06 \times 2 + M_{X6}S)/(S + 2)$ |
| C18:0 | 1.67 | 10.18 | 4.18 | $(4.18 \times 2 + M_{X7}S)/(S + 2)$ |
| C18:1ω-9 | 24.51 | 42.19 | 8.74 | $(8.74 \times 2 + M_{X8}S)/(S + 2)$ |
| C18:2ω-6 | 13.43 | 31.85 | 3.11 | $(3.11 \times 2 + M_{X9}S)/(S + 2)$ |
| C18:3 ω-3 | 0.90 | 1.75 | 1.56 | $(1.56 \times 2 + M_{X10}S)/(S + 2)$ |

According to the above table, the proportions of free fatty acids required to meet the reference range of sn-1,3 fatty acids were obtained and shown in Table 10.

TABLE 10

| The proportions of various fatty acids required to achieve the reference range of sn-1,3 fatty acids under different substrate ratios | | | | | | | | | |
|---|---|---|---|---|---|---|---|---|---|
| Fatty acid | Mixed lipids | Substrate ratio (triglyceride:fatty acid, mol/mol) | | | | | | | |
| | | 1:8 | | 1:10 | | 1:12 | | 1:14 | |
| (mol %) | sn-1,3 | min. | max. | min. | max. | min. | max. | min. | max. |
| C6:0 | 0.09 | −0.01 | 0.15 | −0.01 | 0.15 | 0.00 | 0.15 | 0.00 | 0.15 |
| C8:0 | 1.13 | −0.21 | 1.14 | −0.15 | 1.14 | −0.12 | 1.14 | −0.09 | 1.14 |
| C10:0 | 0.95 | −0.13 | 3.24 | −0.08 | 3.15 | −0.05 | 3.09 | −0.03 | 3.04 |

TABLE 10-continued

The proportions of various fatty acids required to achieve the reference range of sn-1,3 fatty acids under different substrate ratios

| Fatty acid (mol %) | Mixed lipids sn-1,3 | Substrate ratio (triglyceride:fatty acid, mol/mol) | | | | | | | |
| | | 1:8 | | 1:10 | | 1:12 | | 1:14 | |
| | | min. | max. | min. | max. | min. | max. | min. | max. |
|---|---|---|---|---|---|---|---|---|---|
| C12:0 | 4.68 | 0.77 | 9.39 | 0.92 | 9.20 | 1.03 | 9.08 | 1.10 | 8.99 |
| C14:0 | 4.62 | 2.72 | 6.06 | 2.80 | 6.00 | 2.85 | 5.96 | 2.88 | 5.93 |
| C16:0 | 71.06 | −12.53 | 1.22 | −9.18 | 4.02 | −6.96 | 5.88 | −5.36 | 7.21 |
| C18:0 | 4.18 | 1.04 | 11.68 | 1.17 | 11.38 | 1.25 | 11.18 | 1.31 | 11.04 |
| C18:1ω-9 | 8.74 | 28.45 | 50.55 | 27.66 | 48.88 | 27.14 | 47.77 | 26.76 | 46.97 |
| C18:2ω-6 | 3.11 | 16.01 | 39.04 | 15.49 | 37.60 | 15.15 | 36.64 | 14.90 | 35.96 |
| C18:3 ω-3 | 1.56 | 0.74 | 2.19 | 0.77 | 2.10 | 0.79 | 2.04 | 0.81 | 2.00 |

Through model prediction, it was found that the main fatty acid in the fatty acid composition of the product after limiting the acidolysis reaction was palmitic acid. Lower substrate ratios made it difficult to find free fatty acids that met the conditions. On the other hand, higher substrate ratios increased the difficulty of subsequent deacidification and also led to higher production costs. Thus, the substrate molar ratio of 1:12 was chosen for the acidolysis reaction. Therefore, based on the model prediction results, the acyl donors were selected, and after the reaction was completed, the system was further subjected to fractionation and extraction to remove high-saturation triglycerides, thereby obtaining a product consistent with breast milk lipid.

By selecting the optimized acyl donors, a mixture of coconut oil fatty acids rich in medium-chain fatty acids, sunflower seed oil fatty acids rich in linoleic acid, tea seed oil fatty acids rich in oleic acid, and flaxseed oil fatty acids rich in linolenic acid were chosen as the acyl donors. A lipid blending model for the fats was established:

$$FA\ \% = \frac{\sum_{i=2}^{n} Y_i X_i}{\sum_{i=2}^{n} X_i}, \tag{7}$$

wherein $Y_i$ is a molar percentage of each fatty acid in the selected lipids, and $X_i$ is a molar ratio of the selected lipids.

The proportions of fatty acids in sunflower seed oil were set as X1, in tea seed oil as X2, in coconut oil as X3, and in flaxseed oil as X4. Based on the model-predicted fatty acid ranges, the inequalities were established as follows:

$0.62X3/(X1+X2+X3+X4) \leq 0.15$     sn-1,3C6:0

$5.71X3/(X1+X2+X3+X4) \leq 1.14$     sn-1,3C8:0

$5.56X3/(X1+X2+X3+X4) \leq 3.09$     sn-1,3C10:0

$1.03 \leq 47.12X3/(X1+X2+X3+X4) \leq 9.08$     sn-1,3C12:0

$2.85 \leq 19.30X3/(X1+X2+X3+X4) \leq 5.96$     sn-1,3C14:0

$(6.53X1+4.45X2+9.92X3+5.32X4)/(X1+X2+X3+X4) \leq 5.88$     sn-1,3C16:0

$1.25 \leq (3.44X1+1.76X2+3.00X3+3.66X4)/(X1+X2+X3+X4) \leq 11.18$     sn-1,3C18:0

$27.14 \leq (31.25X1+64.61X2+7.03X3+19.45X4)/(X1+X2+X3+X4) \leq 47.77$     sn-1,3C18:1

$15.15 \leq (58.78X1+21.09X2+1.74X3+16.23X4)/(X1+X2+X3+X4) \leq 36.64$     sn-1,3C18:2

$0.79 \leq (8.10X2+54.30X4)/(X1+X2+X3+X4) \leq 2.04$     sn-1,3C18:3

Through calculations, when the ratio of sunflower seed oil to tea seed oil to coconut oil is 5.5:3.5:2, the main fatty acids in the mixed fatty acids were all within the desired range. The composition of the mixed fatty acids was shown in Table 11:

TABLE 11

The composition of the mixed fatty acids

| Fatty acid (mol %) | Content |
|---|---|
| C6:0 | 0.11 |
| C8:0 | 1.04 |
| C10:0 | 1.01 |
| C12:0 | 8.57 |
| C14:0 | 3.51 |
| C16:0 | 6.48 |
| C18:0 | 2.83 |
| C18:1ω-9 | 37.46 |
| C18:2ω-6 | 36.42 |
| C18:3 ω-3 | 2.57 |

According to the prediction model, with a substrate molar ratio of 1:12 (triglycerides/fatty acids) and a mixed fatty acid composition of sunflower seed oil:rapeseed oil:coconut oil=5.5:3.5:2, the mixed lipids were first heated at 60° C. for 20 minutes. After completely melting the lipids, they were filled into a packed-bed reactor. Lipzyme RM IM was used as the catalyst, and the reaction temperature was maintained at 60° C. The lipids were allowed to pass through the packed-bed for 2 hours. The fatty acid composition and distribution of the resulting product were shown in Table 12. Before introducing the lipids into the packed bed reactor, nitrogen gas was first passed through to displace the air inside the reactor.

TABLE 12

The fatty acid characteristics of the acidolysis product

| Fatty acid (mol %) | Total | sn-2 | sn-1,3 |
|---|---|---|---|
| C6:0 | 0.07 | 0.06 | 0.07 |
| C8:0 | 0.55 | 0.16 | 0.75 |
| C10:0 | 0.58 | 0.43 | 0.65 |
| C12:0 | 7.77 | 9.04 | 7.13 |
| C14:0 | 2.42 | 1.36 | 2.95 |

TABLE 12-continued

| The fatty acid characteristics of the acidolysis product | | | |
|---|---|---|---|
| Fatty acid (mol %) | Total | sn-2 | sn-1,3 |
| C16:0 | 43.07 | 57.55 | 35.83 |
| C18:0 | 2.80 | 2.46 | 2.97 |
| C18:1ω-9 | 24.82 | 18.57 | 27.94 |
| C18:2ω-6 | 16.62 | 9.76 | 20.05 |
| C18:3 ω-3 | 1.31 | 0.61 | 1.66 |

After the reaction was completed, the acidolysis product was subjected to programmed fractionation crystallization, aiming to remove saturated triglycerides and some glycerides from the lipids.

Because most of the glycerides in the reaction system contained palmitic acid, their melting points were relatively high. As a result, during the fractionation and extraction process, they crystallized and were removed along with high-melting triglycerides. Some glycerides were prone to form glycerides and chloropropanol esters at high temperatures. Therefore, reducing the content of these glycerides was essential to improve the safety performance of the product.

Meanwhile, due to the relatively high content of free fatty acids, the free fatty acids acted as solvents and dissolved triglycerides and partial glyceride in the system. Therefore, by controlling the temperature, the separation of saturated and unsaturated triglycerides in the system could be better achieved, achieving the effect of wet separation.

The conditions for programmed fractionation and extraction: the mixed lipids were heated to 60° C. and kept at this temperature for 45 minutes until completely dissolved. After that, the acidolysis product was cooled down to 30° C. at a rate of 15 degrees/hour and left to crystallize for 2 hours, allowing the formation of crystal nuclei of palmitic acid and tripalmitin glycerides. The temperature was then reduced to 18° C. at a rate of 4 degrees/hour and left to crystallize for 8 hours, while maintaining the rotation speed at 20 rpm to facilitate the crystallization of partial glycerides containing two palmitic acids. After that, the solid fats in the lipids were removed through filtration or centrifugation, and the liquid oil was obtained. Before and after fractionation and extraction, the content of partial glycerides (monoglycerides and diglycerides) in the system and the yield of liquid triglycerides were shown in Table 13:

TABLE 13

| The glycerides content and product yield in the system before and after fractionation and extraction process | | |
|---|---|---|
| Glyceride (%) | Before fractionation and extraction | After fractionation and extraction |
| triglyceride | 90.22 | 96.89 |
| diglyceride | 7.98 | 2.74 |
| monoglyceride | 1.80 | 0.37 |
| Yield of liquid triglycerides | | 73.6% |

The liquid oil was subjected to vacuum distillation to remove fatty acids and obtain the final product. The fatty acid composition was as shown in Table 14.

TABLE 14

| The fatty acid profile of the separated liquid oil | | | |
|---|---|---|---|
| Fatty acid (mol %) | Total | sn-2 | sn-1,3 |
| C6:0 | 0.10 | 0.07 | 0.11 |
| C8:0 | 0.88 | 0.17 | 1.24 |
| C10:0 | 0.75 | 0.47 | 0.89 |
| C12:0 | 6.97 | 8.73 | 6.08 |
| C14:0 | 2.92 | 1.48 | 3.64 |
| C16:0 | 27.84 | 57.14 | 13.19 |
| C18:0 | 1.74 | 2.28 | 1.47 |
| C18:1ω-9 | 31.64 | 19.01 | 37.96 |
| C18:2ω-6 | 25.26 | 9.99 | 32.89 |
| C18:3ω-3 | 1.91 | 0.66 | 2.54 |
| % sn-2 PA* | 68.41% | | |
| C18:2/C18:3 | 13.2% | | |

*% sn-2PA represents the proportion of sn-2 palmitic acid to the total palmitic acid. The calculation formula is as follows: sn-2 palmitic acid/(3 × total palmitic acid)) ×100%

The final product was determined to have a content of glycerides at 0.18 mg/kg, chloropropanol esters at 0.35 mg/kg, and trans fatty acids at 0.18 g/100 g. The composition of triglycerides in the obtained product was shown in Table 15:

TABLE 15

| The composition of triglycerides in the product (%) | | | |
|---|---|---|---|
| Triglyceride | Content | Triglyceride | Content |
| CaLaLa | 0.02 | MOL | 0.58 |
| BuOP | 0.00 | LaOO | 3.71 |
| MlaCa | 0.01 | POLa | 5.42 |
| CaLaL | 0.08 | POL | 17.00 |
| CaLaO | 0.11 | PPL | 7.16 |
| LaLaM | 0.07 | MPO | 1.89 |
| LaLaO | 0.89 | OOO | 3.99 |
| CaPL | 0.46 | POO | 17.17 |
| LLL | 1.33 | PPO | 8.09 |
| LaOL | 6.14 | SOO | 0.36 |
| CaPO | 0.52 | POS | 1.56 |
| OLL | 4.99 | PPS | 0.65 |
| PLL | 14.44 | PPP | 2.75 |
| C52 triglyceride | | | 50.17 |

The content of C52 triglycerides in the obtained product was 50.17%, the content of % sn-2 PA in the obtained product was 68.41%, the content of tripalmitin in the obtained product was 2.75%. All three components meet the requirements of the national safety standard GB30604-2015 "Food Nutrient Fortifier 1,3-Dioleoyl-2-palmitic acid triglyceride" (% sn-2 PA ≥52%, C52 triglycerides ≥40%, tripalmitin <10%).

The obtained product was evaluated using a similarity assessment model. The product showed a high similarity to breast milk lipid in terms of fatty acid composition, distribution, and triglyceride composition.

The calculation formula of the evaluation model used was as follows:

$$G_{FA/sn-2FA/TAG} = 100 - \sum_{i=1}^{n} E_{i(FA/sn-2FA/TAG)}$$

$$E_{i(FA/sn-2FA/TAG)} = 100 \times \left( C_{i(FA/sn-2FA/TAG)} \frac{D_{i(FA/sn-2FA/TAG)}}{\sum_{i=1}^{n} D_{i(FA/sn-2FA/TAG)}} \right)$$

-continued $$C_{i(FA/sn-2FA/TAG)} = \frac{|B_{i(FA/sn-2FA/TAG)} - A_{i(FA/sn-2FA/TAG)}|}{A_{i(FA/sn-2FA/TAG)}}$$

wherein $G_{FA/sn-2FA/TAG}$ represented the similarity of breast milk structured lipid to human breast milk lipid in terms of fatty acid composition, relative content of sn-2 fatty acids, or triglyceride composition, respectively; $E_{i(FA/sn-2FA/TAG)}$ represented the similarity of the fatty acid composition, relative content of sn-2 fatty acids, or triglyceride composition deducted from the corresponding index content range of breast milk lipid in breast milk structured lipid, respectively;

$$D_{i(FA/sn-2FA/TAG)}/\sum_{i=1}^{n} D_{i(FA/sn-2FA/TAG)}$$

was the relative value of the fatty acid, sn-2 fatty acid, or triglyceride composition of breast milk lipid compared to its total content; $C_{i(FA/sn-2FA/TAG)}$ was a floating coefficient, which depends on the total fatty acid content, relative content of sn-2 fatty acids, or triglyceride composition of the breast milk structured lipid; $B_{i(FA/sn-2FA/TAG)}$ was the total fatty acid content, relative content of sn-2 fatty acids, or triglyceride content in breast milk structured lipid; $A_{i(FA/sn-2FA/TAG)}$ was the total fatty acid content, relative content of sn-2 fatty acids, or triglyceride composition of corresponding breast milk lipid; when B was higher than A, A selected the upper limit; when B was less than A, A selected the lower limit; if B was within the range of A, C was 0.

After evaluating the similarity through a similarity model, the mixed lipids and ester exchange products were found to have the following similarity to human breast milk lipid in terms of fatty acid, sn-2 fatty acid, and triglyceride composition, as shown in the Table 16:

TABLE 16

| Similarity between product and breast milk lipid | |
|---|---|
| Similarity (%) | Acidolysis product |
| $G_{FA}$ | 98.1 |
| $G_{sn-2FA}$ | 95.2 |
| $G_{TAG}$ | 92.4 |

By comparing the similarity between the acidolysis product and the breast milk lipid using the evaluation model, it was found that the resulting product not only exhibited a matching fatty acid composition and distribution as in the breast milk lipid, but also showed a high degree of similarity in triglyceride composition.

Example 3

Palm stearin containing 91.2% of palmitic acid and 84.3% of sn-2 palmitic acid was selected as the starting material, and the fatty acid composition and distribution of palm stearin were shown in Table 17.

TABLE 17

| Characteristics of palm stearin fatty acids | | | |
|---|---|---|---|
| Fatty acid | Palm stearin | | |
| (mol %) | Total | sn-2 | sn-1,3 |
| C14:0 | 1.4 | 0.5 | 1.9 |
| C16:0 | 91.2 | 84.3 | 94.7 |
| C18:0 | 3.1 | 4.6 | 2.4 |
| C18:1ω-9 | 3.6 | 8.8 | 1.0 |
| C18:2ω-6 | 0.7 | 1.8 | 0.2 |

Acidolysis is a reversible transesterification reaction. Therefore, in the reaction, palmitic acid at the sn-1,3 positions of palm stearin participated in the reaction and got replaced by other fatty acids. However, due to the reversibility of the acid-hydrolysis reaction, the substituted palmitic acid could also be esterified back into the sn-1,3 positions. Thus, the reaction product also contained triglycerides with high saturation after the reaction was completed. These triglycerides had relatively high melting points, making them extremely difficult to be absorbed if ingested by infants. Therefore, they should be removed from the reactants. Meanwhile, due to the presence of a relatively high amount of palmitic acid in the starting reactants, the total palmitic acid content in the product after the reaction exceeded that of breast milk lipid. To ensure that the palmitic acid content remained within the range found in the breast milk lipid, further fractionation and extraction of the acid-hydrolyzed lipid was necessary after the reaction, in order to ensure that the palmitic acid content was within the range of breast milk lipid.

First, oleic acid was used as the acyl donor, and the palm stearin selected in this example was used as the raw material for acidolysis reaction under substrate ratios of 1:8, 1:10, 1:12, and 1:14 (palm stearin:fatty acid, mol/mol). The reaction temperature was 60° C., the duration was 10 hours, and the enzyme dosage was 10%. The content of palmitic acid in the system after reaction was detected, and the results were shown in Table 18 below:

TABLE 18

| Palmitic acid content of acidolysis products under different substrate molar ratios | | | | |
|---|---|---|---|---|
| Substrate ratio | 1:8 | 1:10 | 1:12 | 1:14 |
| Palmitic acid (mol %) | 55.3 | 51.4 | 46.3 | 42.7 |

After comparison, the lipids were mixed based one the subsequent removal of up to 25% of palmitic acid to meet the required palmitic acid content in breast milk lipid. That is, after the reaction was completed and saturated triglycerides were removed through fractionation and extraction, the sn-2 fatty acid content in the system remained within the range found in breast milk lipid. Therefore, based on the increase of 25% in palmitic acid content in sn-2 fatty acids of breast milk lipid and the decrease of 25% in the content of other fatty acids excluding palmitic acid, the blending of palm stearin was conducted, and the obtained ranges were shown in Table 19.

TABLE 19

| Reference range for sn-2 fatty acid mixture | | |
|---|---|---|
| Fatty acid | sn-2 | |
| (mol %) | min. | max. |
| C6:0 | 0.01 | 0.08 |
| C8:0 | 0.02 | 0.81 |
| C10:0 | 0.27 | 1.22 |
| C12:0 | 1.46 | 10.27 |
| C14:0 | 2.47 | 13.91 |
| C16:0 | 46.28 | 82.91 |
| C18:0 | 0.89 | 2.57 |
| C18:1ω-9 | 4.06 | 17.45 |
| C18:2ω-6 | 1.94 | 13.05 |
| C18:3 ω-3 | 0.41 | 2.09 |

Compared to the obtained range of sn-2 fatty acids, palm stearin lacked medium-chain fatty acids at the sn-2 position, such as C6:0, C8:0, C10:0, and C12:0, with lower content of C14:0 and C18:2, and it did not contain C18:3. Therefore, palm kernel oil rich in medium-chain fatty acids, sunflower seed oil rich in linoleic acid, tea seed oil rich in oleic acid, and flaxseed oil rich in linolenic acid were chosen to regulate the composition of sn-2 fatty acids in palm stearin. The required amount of lipids was calculated and predicted through the establishment of a model of sn-2 fatty acid composition in the mixed fats.

TABLE 20

| Fatty acid characteristics of selected mixed lipids | | | | | | | | | | | |
|---|---|---|---|---|---|---|---|---|---|---|---|
| Fatty acid | Sunflower oil X1 | | | Tea seed oil X2 | | | Palm kernel oil X3 | | | Flaxseed oil X4 | | |
| (mol %) | Total | sn-2 | sn-1,3 | Total | sn-2 | sn-1,3 | Total | sn-2 | sn-1,3 | Total | sn-2 | sn-1,3 |
| C6:0 | | | | | | | 0.2 | 0.05 | 0.28 | | | |
| C8:0 | | | | | | | 2.99 | 1.78 | 3.6 | | | |
| C10:0 | | | | | | | 3.17 | 2.89 | 3.31 | | | |
| C12:0 | | | | | | | 47.14 | 61.38 | 40.02 | | | |
| C14:0 | | | | | | | 16.39 | 18.98 | 15.1 | | | |
| C16:0 | 6.53 | 4.62 | 7.49 | 4.45 | 1.82 | 5.76 | 8.83 | 4.65 | 10.92 | 5.32 | 5.18 | 5.39 |
| C18:0 | 3.44 | 2.42 | 3.95 | 1.76 | 0.89 | 2.19 | 2.29 | 0.84 | 3.02 | 3.66 | 2.38 | 4.45 |
| C18:1 | 31.25 | 22.8 | 35.48 | 64.61 | 55.39 | 69.22 | 16.28 | 7.51 | 20.62 | 19.45 | 31.7 | 13.73 |
| C18:2 | 58.78 | 70.16 | 53.09 | 21.09 | 31.74 | 15.76 | 2.71 | 1.92 | 3.13 | 17.27 | 27.46 | 11.62 |
| C18:3 | | | | 8.1 | 10.16 | 7.07 | | | | 54.3 | 33.28 | 64.81 |

Sunflower oil was set as X1, tea seed oil was set as X2, palm kernel oil was set as X3, and flaxseed oil was set as X4. Based on the composition of sn-2 fatty acids in breast milk lipid, an inequality was established using a mixing model, as shown below.

$$0.01 \leq 0.05X3/(1+X1+X2+X3+X4) \leq 0.08 \qquad \text{sn-2 C6:0}$$

$$0.02 \leq 1.78X3/(1+X1+X2+X3+X4) \leq 0.81 \qquad \text{sn-2 C8:0}$$

$$0.27 \leq 2.89X3/(1+X1+X2+X3+X4) \leq 1.22 \qquad \text{sn-2 C10:0}$$

$$1.46 \leq 61.38X3/(1+X1+X2+X3+X4) \leq 10.27 \qquad \text{sn-2 C12:0}$$

$$2.47 \leq (0.5+18.98X3)/(1+X1+X2+X3+X4) \leq 13.91 \qquad \text{sn-2 C14:0}$$

$$46.28 \leq (84.3+4.62X1+1.82X2+4.65X3+5.18X4)/(1+X1+X2+X3+X4) \leq 82.91 \qquad \text{sn-2 C16:0}$$

$$0.89 \leq (4.6+2.42X1+0.89X2+0.84X3+2.38X4)/(1+X1+X2+X3+X4) \leq 2.57 \qquad \text{sn-2 C18:0}$$

$$4.06 \leq (8.8+22.8X1+55.39X2+7.51X3+31.7X4)/(1+X1+X2+X3+X4) \leq 17.45 \qquad \text{sn-2 C18:1}$$

$$1.94 \leq (1.8+70.16X1+31.74X2+1.92X3+27.46X4)/(1+X1+X2+X3+X4) \leq 13.05 \qquad \text{sn-2 C18:2}$$

$$0.41 \leq (10.16X2+33.28X4)/(1+X1+X2+X3+X4) \leq 2.09 \qquad \text{sn-2 C18:3}$$

Through solving the inequality, it could be seen that the lipid blend proportions satisfying the reference range for sn-2 fatty acids were as follows: palm stearin to sunflower seed oil, rapeseed oil, palm kernel oil, and flaxseed oil was 1:(0-0.18):(0-0.15):(0.12-0.27):(0.02-0.05). In order to achieve higher sn-2 palmitic acid content in the mixed lipids while meeting the sn-2 fatty acid composition of breast milk lipid, a lower proportion of external lipid were chosen for blending. That is, the ratio of palm stearin to sunflower seed oil to tea seed oil to palm kernel oil to flaxseed oil was 1:0.02:0.02:0.17:0.03. The fatty acid composition and distribution of the obtained mixed lipids were shown in Table 21.

TABLE 21

| The fatty acid characteristics of the mixed lipids | | | |
|---|---|---|---|
| Fatty acid (mol %) | Total | sn-2 | sn-1,3 |
| C6:0 | 0.03 | 0.01 | 0.04 |
| C8:0 | 0.41 | 0.24 | 0.49 |
| C10:0 | 0.43 | 0.40 | 0.45 |

TABLE 21-continued

| The fatty acid characteristics of the mixed lipids | | | |
|---|---|---|---|
| Fatty acid (mol %) | Total | sn-2 | sn-1,3 |
| C12:0 | 6.46 | 8.42 | 5.49 |
| C14:0 | 3.40 | 3.01 | 3.60 |
| C16:0 | 75.09 | 68.85 | 78.21 |
| C18:0 | 3.02 | 3.94 | 2.56 |
| C18:1ω-9 | 7.15 | 10.15 | 5.65 |
| C18:2ω-6 | 2.66 | 4.02 | 1.98 |
| C18:3 ω-3 | 1.44 | 0.97 | 1.68 |

The sn-2 fatty acids of the mixed lipids fell within the reference range. However, concerning the composition of sn-1,3 fatty acids, the mixed lipids had a higher content of palmitic acid and lower content of oleic acid and linoleic acid. Therefore, the sn-1,3 fatty acid composition of the mixed lipids was regulated by selecting acyl donors and utilizing acidolysis reaction catalyzed by sn-1,3 lipase.

Based on the sn-1,3 fatty acid composition of breast milk lipid, an acidolysis fatty acid equilibrium model was established to predict the substrate ratios and the proportions of free fatty acids that would meet the sn-1,3 fatty acid composition of breast milk lipid. However, as previously shown, the separation of saturated triglycerides from the lipid system after the reaction was completed had an impact on the composition of sn-1,3 fatty acids in the lipids. Therefore, taking into account the 25% palmitic acid in the separated system, if the sn-1,3 fatty acid composition of the product needs to be within the range of breast milk lipid, the first step is to reduce the content of other fatty acids in sn-1,3 position of breast milk lipid by 25%, excluding palmitic acid. Then, the palmitic acid content in the sn-1,3 position should be increased by 25%. The reference range of the resulting sn-1,3 fatty acid composition was shown in Table 22.

TABLE 22

| Reference concentration range for sn-1,3 fatty acid mixtures | | |
|---|---|---|
| Fatty acid | sn-1,3 | |
| (mol %) | min. | max. |
| C6:0 | 0.01 | 0.14 |
| C8:0 | 0.06 | 1.07 |
| C10:0 | 0.08 | 2.61 |
| C12:0 | 1.46 | 7.92 |
| C14:0 | 2.91 | 5.41 |
| C16:0 | 4.36 | 15.83 |
| C18:0 | 1.57 | 9.55 |
| C18:1ω-9 | 22.98 | 39.56 |
| C18:2ω-6 | 12.59 | 29.86 |
| C18:3 ω-3 | 0.85 | 1.64 |

Therefore, based on the reference range of sn-1,3 fatty acid composition, the fatty acid balance model through acidolysis reaction could predict the substrate ratios and the proportion of free fatty acids that meet the criteria. Using the acidolysis fatty acid equilibrium model was possible to calculate the proportions of free fatty acids required to achieve the reference range of sn-1,3 fatty acids in breast milk lipid for different substrate ratios, as shown in Table 23.

TABLE 23

| The theoretical values of the various fatty acids required to achieve the reference range of sn-1,3 fatty acids | | | | | | | | |
|---|---|---|---|---|---|---|---|---|
| Fatty acid | Mixed lipid | Substrate ratio (triglyceride: fatty acid, mol/mol) | | | | | | |
| | | 1:8 | | 1:10 | | 1:12 | | 1:14 |
| (mol %) | sn-1,3 | min. | max. | min. | max. | min. | max. | min. | max. |
| C6:0 | 0.04 | 0.00 | 0.17 | 0.00 | 0.16 | 0.01 | 0.16 | 0.01 | 0.15 |
| C8:0 | 0.49 | −0.05 | 1.22 | −0.03 | 1.19 | −0.01 | 1.17 | 0.00 | 1.15 |
| C10:0 | 0.45 | −0.01 | 3.15 | 0.01 | 3.04 | 0.02 | 2.97 | 0.03 | 2.92 |
| C12:0 | 5.49 | 0.45 | 8.53 | 0.65 | 8.41 | 0.79 | 8.33 | 0.88 | 8.27 |
| C14:0 | 3.60 | 2.74 | 5.86 | 2.77 | 5.77 | 2.80 | 5.71 | 2.81 | 5.67 |
| C16:0 | 78.21 | −14.10 | 0.24 | −10.41 | 3.35 | −7.95 | 5.43 | −6.19 | 6.92 |
| C18:0 | 2.56 | 1.32 | 11.30 | 1.37 | 10.95 | 1.41 | 10.72 | 1.43 | 10.55 |
| C18:1ω-9 | 5.65 | 27.31 | 48.04 | 26.45 | 46.34 | 25.87 | 45.21 | 25.46 | 44.40 |
| C18:2ω-6 | 1.98 | 15.24 | 36.83 | 14.71 | 35.44 | 14.36 | 34.51 | 14.11 | 33.84 |
| C18:3 ω-3 | 1.68 | 0.64 | 2.05 | 0.68 | 1.97 | 0.71 | 1.91 | 0.73 | 1.87 |

Through model prediction, it was found that the main fatty acid in the fatty acid composition of the product after limiting the acidolysis reaction was palmitic acid. Lower substrate ratios made it difficult to find free fatty acids that met the conditions. On the other hand, higher substrate ratios increased the difficulty of subsequent deacidification and also led to higher production costs. Thus, the substrate molar ratio of 1:14 was chosen for the acidolysis reaction. Therefore, based on the model prediction results, the acyl donors were selected, and after the reaction was completed, the system was further subjected to fractionation and extraction to remove high-saturation triglycerides, thereby obtaining a product consistent with breast milk lipid.

By selecting the optimized acyl donors, a mixture of palm kernel oil fatty acids rich in medium-chain fatty acids, sunflower seed oil fatty acids rich in linoleic acid, tea seed oil fatty acids rich in oleic acid, and flaxseed oil fatty acids rich in linolenic acid were chosen as the acyl donors. According to the reference range of sn-1,3 fatty acids and the fatty acid blending model, an inequality was established.

Sunflower oil was set as X1, tea seed oil was set as X2, palm kernel oil was set as X3, and flaxseed oil was set as X4. Based on the predicted range of fatty acids in the model, an inequality was established as follows:

$$0.2X3/(X1+X2+X3+X4) \leq 0.15 \qquad \text{sn-1,3C6:0}$$

$$2.99X3/(X1+X2+X3+X4) \leq 1.15 \qquad \text{sn-1,3C8:0}$$

$$0.03 \leq 3.17X3/(X1+X2+X3+X4) \leq 2.92 \qquad \text{sn-1,3C10:0}$$

$$0.88 \leq 47.14X3/(X1+X2+X3+X4) \leq 8.27 \qquad \text{sn-1,3C12:0}$$

$$2.81 \leq 16.39X3/(X1+X2+X3+X4) \leq 5.67 \qquad \text{sn-1,3C14:0}$$

$$(6.53X1+8.72X2+8.83X3+5.32X4)/(X1+X2+X3+X4) \leq 6.92 \qquad \text{sn-1,3C16:0}$$

$$1.43 \leq (3.44X1+3.68X2+2.29X3+3.66X4)/(X1+X2+X3+X4) \leq 10.55 \qquad \text{sn-1,3C18:0}$$

$$25.46 \leq (31.25X1+65.71X2+16.25X3+19.45X4)/(X1+X2+X3+X4) \leq 44.4 \qquad \text{sn-1,3C18:1}$$

$$14.11 \leq (58.78X1+21.89X2+2.71X3+16.23X4)/(X1+X2+X3+X4) \leq 33.84 \qquad \text{sn-1,3C18:2}$$

$$0.73 \leq 54.30X4/(X1+X2+X3+X4) \leq 1.87 \qquad \text{sn-1,3C18:3}$$

Through calculations, when the ratio of sunflower seed oil to tea seed oil to coconut oil is 12:8:5, the main fatty acids in the mixed fatty acids were all within the desired range. The composition of the mixed fatty acids was shown in Table 24:

TABLE 24

The composition of the mixed fatty acids

| Fatty acid (mol %) | Content |
|---|---|
| C6:0 | 0.11 |
| C8:0 | 0.97 |
| C10:0 | 0.95 |
| C12:0 | 8.04 |
| C14:0 | 3.30 |
| C16:0 | 6.30 |
| C18:0 | 2.71 |
| C18:1ω-9 | 41.13 |
| C18:2ω-6 | 33.33 |
| C18:3 ω-3 | 3.16 |

According to the prediction model, with a substrate molar ratio of 1:14 (triglycerides/fatty acids) and a mixed fatty acid composition of sunflower seed oil:rapeseed oil:coconut oil=12:8:5, the mixed lipids were first heated at 55° C. for 45 minutes. After completely melting the lipids, they were filled into a packed-bed reactor. NS 40086 was used as the catalyst, and the reaction temperature was maintained at 50° C. The lipids were allowed to pass through the packed-bed for 5 hours. The fatty acid composition and distribution of the resulting product were shown in Table 25. Before introducing the lipids into the packed bed reactor, nitrogen gas was first passed through to displace the air inside the reactor.

TABLE 25

The fatty acid characteristics of the acidolysis product

| Fatty acid (mol %) | Total | sn-2 | sn-1,3 |
|---|---|---|---|
| C6:0 | 0.05 | 0.01 | 0.07 |
| C8:0 | 0.57 | 0.18 | 0.76 |
| C10:0 | 0.59 | 0.36 | 0.71 |
| C12:0 | 7.77 | 8.22 | 7.55 |
| C14:0 | 3.30 | 2.85 | 3.52 |
| C16:0 | 38.86 | 65.47 | 25.56 |
| C18:0 | 2.63 | 3.38 | 2.25 |
| C18:1ω-9 | 25.92 | 13.13 | 32.32 |
| C18:2ω-6 | 18.75 | 5.57 | 25.34 |
| C18:3 ω-3 | 1.56 | 0.83 | 1.92 |

After the reaction was completed, the acidolysis product was subjected to programmed fractionation crystallization, aiming to remove saturated triglycerides and some glycerides from the lipids.

Because most of the glycerides in the reaction system contained palmitic acid, their melting points were relatively high. As a result, during the fractionation and extraction process, they crystallized and were removed along with high-melting triglycerides. Some glycerides were prone to form glycerides and chloropropanol esters at high temperatures. Therefore, reducing the content of these glycerides was essential to improve the safety performance of the product.

Meanwhile, due to the relatively high content of free fatty acids, the free fatty acids acted as solvents and dissolved triglycerides and partial glycerides in the system. Therefore, by controlling the temperature, the separation of saturated and unsaturated triglycerides in the system could be better achieved.

The conditions for programmed fractionation and extraction: the mixed lipids were heated to 65° C. and kept at this temperature for 30 minutes until completely dissolved. After that, the acidolysis product was cooled down to 26° C. at a rate of 5 degrees/hour and left to crystallize for 8 hours, allowing the formation of crystal nuclei of palmitic acid and tripalmitin glycerides. The temperature was then reduced to 13° C. at a rate of 6 degrees/hour and left to crystallize for 4 hours, while maintaining the rotation speed at 30 rpm per minute to facilitate the crystallization of partial glycerides containing two palmitic acids. After that, the solid fats in the lipids were removed through filtration or centrifugation, and the liquid oil was obtained. Before and after fractionation and extraction, the content of partial glycerides (monoglycerides and diglycerides) in the system and the yield of liquid triglycerides were shown in Table 26:

TABLE 26

The glycerides content and product yield in the system before and after fractionation and extraction process

| Glyceride (%) | Before fractionation and extraction | After fractionation and extraction |
|---|---|---|
| triglyceride | 91.91 | 97.64 |
| diglyceride | 6.55 | 2.12 |
| monoglyceride | 1.54 | 0.24 |
| Yield of liquid triglycerides | 71.5% | |

The liquid oil was subjected to vacuum distillation to remove fatty acids and obtain the final product. The fatty acid composition was as shown in Table 27.

TABLE 27

The fatty acid profile of the separated liquid oil

| Fatty acid (mol %) | Total | sn-2 | sn-1,3 |
|---|---|---|---|
| C6:0 | 0.06 | 0.01 | 0.09 |
| C8:0 | 0.72 | 0.24 | 0.96 |
| C10:0 | 0.76 | 0.49 | 0.89 |
| C12:0 | 9.22 | 11.15 | 8.25 |
| C14:0 | 3.09 | 2.99 | 3.15 |
| C16:0 | 28.48 | 58.48 | 13.48 |
| C18:0 | 2.21 | 2.85 | 1.89 |
| C18:1ω-9 | 30.95 | 16.46 | 38.20 |
| C18:2ω-6 | 22.51 | 6.20 | 30.67 |
| C18:3 ω-3 | 1.99 | 1.13 | 2.42 |
| % sn-2 PA* | 68.44% | | |
| C18:2/C18:3 | 11.32% | | |

*% sn-2PA represents the proportion of sn-2 palmitic acid to the total palmitic acid. The calculation formula is as follows: sn-2 palmitic acid/(3 × total palmitic acid)) × 100%

The final product was determined to have a content of glycerides at 0.11 mg/kg, chloropropanol esters at 0.31 mg/kg, and trans fatty acids at 0.12 g/100 g.

Through liquid chromatography analysis, the triglyceride composition of the obtained product was shown in Table 28.

TABLE 28

Triglyceride composition of the product (%)

| Triglyceride | Content | Triglyceride | Content |
|---|---|---|---|
| CaLaLa | 0.01 | MOL | 0.34 |
| BuOP | 0.00 | LaOO | 3.04 |
| MLaCa | 0.01 | POLa | 5.55 |
| CaLaL | 0.05 | POL | 18.21 |
| CaLaO | 0.08 | PPL | 7.32 |
| LaLaM | 0.05 | MPO | 1.95 |
| LaLaO | 0.65 | OOO | 2.91 |
| CaPL | 0.43 | POO | 20.96 |

TABLE 28-continued

| Triglyceride composition of the product (%) | | | |
|---|---|---|---|
| Triglyceride | Content | Triglyceride | Content |
| LLL | 0.82 | PPO | 8.94 |
| LaOL | 4.61 | SOO | 0.22 |
| CaPO | 0.52 | POS | 1.57 |
| OLL | 3.05 | PPS | 0.63 |
| PLL | 14.51 | PPP | 3.59 |
| C52 triglyceride | | | 55.25 |

The content of C52 triglycerides in the obtained product was 55.25%, the content of % sn-2 PA in the obtained product was 68.44%, the content of tripalmitin in the obtained product was 3.59%. All three components meet the requirements of the national safety standard GB30604-2015 "Food Nutrient Fortifier 1,3-Dioleoyl-2-palmitic acid triglyceride" (% sn-2 PA ≥52%, C52 triglycerides ≥40%, tripalmitin <10%).

After evaluating the similarity through a similarity model, the mixed lipids and ester exchange products were found to have the following similarity to human breast milk lipid in terms of fatty acid, sn-2 fatty acid, and polyunsaturated fatty acid and triglyceride composition, as shown in the Table 29:

TABLE 29

| Similarity between product and breast milk lipid | |
|---|---|
| Similarity (%) | Acidolysis product |
| $G_{FA}$ | 97.3 |
| $G_{sn-2FA}$ | 93.5 |
| $G_{TAG}$ | 91.2 |

By comparing the similarity between the acidolysis product and the breast milk lipid using the evaluation model, it was found that the resulting product not only exhibited a matching fatty acid composition and distribution as in the breast milk lipid, but also showed a high degree of similarity in triglyceride composition.

Example 4

Palm stearin containing 70.3% of palmitic acid and 58.3% of sn-2 palmitic acid was selected as the starting material, and the fatty acid composition and distribution of palm stearin were shown in Table 30.

TABLE 30

| Characteristics of palm stearin fatty acids | | | |
|---|---|---|---|
| | | Palm stearin | |
| Fatty acid mol %) | Total | Sn-2 | sn-1,3 |
| C14:0 | 1.4 | 0.8 | 1.7 |
| C16:0 | 70.3 | 59.3 | 75.8 |
| C18:0 | 5.6 | 6.2 | 5.3 |
| C18:1ω-9 | 18.8 | 24.5 | 15.95 |
| C18:2ω-6 | 3.9 | 9.2 | 1.25 |

Acidolysis is a reversible transesterification reaction. Therefore, in the reaction, palmitic acid at the sn-1,3 positions of palm stearin participated in the reaction and got replaced by other fatty acids. However, due to the reversibility of the acid-hydrolysis reaction, the substituted palmitic acid could also be esterified back into the sn-1,3 positions. Thus, the reaction product also contained triglycerides with high saturation after the reaction was completed. These triglycerides had relatively high melting points, making them extremely difficult to be absorbed if ingested by infants. Therefore, they should be removed from the reactants. Meanwhile, due to the presence of a relatively high amount of palmitic acid in the starting reactants, the total palmitic acid content in the product after the reaction exceeded that of breast milk lipid. To ensure that the palmitic acid content remained within the range found in the breast milk lipid, further fractionation and extraction of the acid-hydrolyzed lipid was necessary after the reaction, in order to ensure that the palmitic acid content was within the range of breast milk lipid.

Oleic acid was used as the acyl donor, and the palm stearin selected in this example was used as the raw material for acidolysis reaction under substrate ratios of 1:6, 1:8, 1:10, and 1:12 (palm stearin:fatty acid, mol/mol). The reaction temperature was 60° C., the duration was 8 hours, and the enzyme dosage was 10%. The content of palmitic acid in the system after reaction was detected, and the results were shown in Table 31 below:

TABLE 31

| Palmitic acid content of acidolysis products under different substrate molar ratios | | | | |
|---|---|---|---|---|
| Substrate ratio | 1:6 | 1:8 | 1:10 | 1:12 |
| Palmitic acid (mol %) | 44.1% | 39.3% | 36.6% | 32.5% |

After comparison, the lipids were mixed based one the subsequent removal of up to 15% of palmitic acid to meet the required palmitic acid content in breast milk lipid. That is, after the reaction was completed and saturated triglycerides were removed through fractionation and extraction, the sn-2 fatty acid content in the system remained within the range found in breast milk lipid. Therefore, based on the increase of 10% in palmitic acid content in sn-2 fatty acids of breast milk lipid and the decrease of 15% in the content of other fatty acids excluding palmitic acid, the blending of palm stearin was conducted, and the obtained ranges were shown in Table 32.

TABLE 32

| Reference range for sn-2 fatty acid mixture | | |
|---|---|---|
| Fatty acid | sn-2 | |
| (mol %) | min | max |
| C6:0 | 0.01 | 0.09 |
| C8:0 | 0.03 | 0.92 |
| C10:0 | 0.31 | 1.38 |
| C12:0 | 1.66 | 11.64 |
| C14:0 | 2.80 | 15.77 |
| C16:0 | 42.57 | 76.28 |
| C18:0 | 1.00 | 2.92 |
| C18:1ω-9 | 4.60 | 19.78 |
| C18:2ω-6 | 2.20 | 14.79 |
| C18:3 ω-3 | 0.47 | 2.36 |

Compared to the obtained range of sn-2 fatty acids, the palm stearin of this example lacked medium-chain fatty acids at the sn-2 position, such as C6:0, C8:0, C10:0, and C12:0, with lower content of C14:0, and it did not contain C18:3. Therefore, coconut oil rich in medium-chain fatty acids, soybean oil rich in linoleic acid, tea seed oil rich in oleic acid, and flaxseed oil rich in linolenic acid were chosen to regulate the composition of sn-2 fatty acids in palm stearin, aligning it within the reference range of sn-2 fatty acids.

TABLE 33

Fatty acid characteristics of selected mixed lipids

| Fatty acid | Soybean oil X1 | | | Tea seed oil X2 | | | Coconut oil X3 | | | Flaxseed oil X4 | | |
|---|---|---|---|---|---|---|---|---|---|---|---|---|
| (mol %) | Total | sn-2 | sn-1,3 | Total | sn-2 | sn-1,3 | Total | sn-2 | sn-1,3 | Total | sn-2 | sn-1,3 |
| C6:0 | | | | | | | 0.62 | 0.57 | 0.65 | | | |
| C8:0 | | | | | | | 5.71 | 1.43 | 7.85 | | | |
| C10:0 | | | | | | | 5.56 | 3.46 | 6.61 | | | |
| C12:0 | | | | | | | 47.12 | 76.42 | 32.47 | | | |
| C14:0 | | | | | | | 19.3 | 9.35 | 24.28 | | | |
| C16:0 | 8.99 | 3.56 | 11.71 | 8.72 | 5.18 | 10.49 | 9.92 | 3.01 | 13.38 | 5.32 | 5.18 | 5.39 |
| C18:0 | 4.6 | 1.94 | 5.94 | 3.68 | 2.11 | 4.47 | 3 | 0.87 | 4.07 | 3.66 | 2.38 | 4.45 |
| C18:1 | 23.52 | 24.44 | 23.06 | 65.71 | 52.65 | 72.24 | 7.03 | 3.62 | 8.74 | 19.45 | 31.7 | 13.73 |
| C18:2 | 56.02 | 65.38 | 51.34 | 21.89 | 40.06 | 12.81 | 1.74 | 1.27 | 1.98 | 17.27 | 27.46 | 11.62 |
| C18:3 | 6.87 | 4.68 | 7.95 | | | | | | | 54.3 | 33.28 | 64.81 |

The required amount of lipids was calculated through the establishment of a model of sn-2 fatty acid composition in the mixed fats. Soybean oil was set as X1, tea seed oil was set as X2, coconut oil was set as X3, and flaxseed oil was set as X4. Based on the reference range of sn-2 fatty acid mixture, an inequality was established using a mixing model, as shown below.

$$0.01 \leq 0.57X3/(1+X1+X2+X3+X4) \leq 0.09 \quad \text{sn-2 C6:0}$$

$$0.03 \leq 1.43X3/(1+X1+X2+X3+X4) \leq 0.92 \quad \text{sn-2 C8:0}$$

$$0.31 \leq 3.46X3/(1+X1+X2+X3+X4) \leq 1.38 \quad \text{sn-2C10:0}$$

$$1.66 \leq 76.42X3/(1+X1+X2+X3+X4) \leq 11.64 \quad \text{sn-2C12:0}$$

$$2.80 \leq (0.8+9.35X3)/(1+X1+X2+X3+X4) \leq 15.77 \quad \text{sn-2C14:0}$$

$$42.57 \leq (59.3+3.56X1+5.18X2+3.01X3+5.18X4)/(1+X1+X2+X3+X4) \leq 76.28 \quad \text{sn-2C16:0}$$

$$1 \leq (6.2+1.92X1+2.11X2+0.87X3+2.38X4)/(1+X1+X2+X3+X4) \leq 2.92 \quad \text{sn-2C18:0}$$

$$4.60 \leq (24.5+24.44X1+52.65X2+3.62X3+31.7X4)/(1+X1+X2+X3+X4) \leq 19.78 \quad \text{sn-2C18:1}$$

$$2.20 \leq (9.2+65.38X1+40.06X2+1.27X3+27.46X4)/(1+X1+X2+X3+X4) \leq 14.79 \quad \text{sn-2 C18:2}$$

$$0.47 \leq (4.68X1+33.28X4)/(1+X1+X2+X3+X4) \leq 2.36 \quad \text{sn-2 C18:3}$$

Through solving the inequality, it could be determined that when the ratio of palm stearin to soybean oil, rapeseed oil, coconut oil, and flaxseed oil was 1:(0-0.1):(0-0.05):(0.1-0.2):(0.02-0.08), the main fatty acids in the sn-2 position of mixed lipids were within the range of sn-2 fatty acid composition in breast milk lipid.

In order to achieve higher sn-2 palmitic acid content in the mixed lipids while meeting the sn-2 fatty acid composition of breast milk lipid, a lower proportion of external lipid were chosen for blending. That is, the ratio of palm stearin to soybean oil to tea seed oil to coconut oil to flaxseed oil was 1:0.02:0.02:0.11:0.02. The fatty acid composition and distribution of the obtained mixed lipids were shown in Table 34.

TABLE 34

The fatty acid characteristics of the mixed lipids

| Fatty acid (mol %) | Total | sn-2 | sn-1,3 |
|---|---|---|---|
| C6:0 | 0.06 | 0.05 | 0.06 |
| C8:0 | 0.54 | 0.13 | 0.74 |
| C10:0 | 0.52 | 0.33 | 0.62 |
| C12:0 | 4.43 | 7.18 | 3.05 |
| C14:0 | 3.01 | 1.56 | 3.74 |
| C16:0 | 61.41 | 51.20 | 66.52 |
| C18:0 | 5.27 | 5.49 | 5.17 |
| C18:1ω-9 | 18.59 | 20.14 | 16.32 |
| C18:2ω-6 | 5.12 | 10.25 | 2.55 |
| C18:3 ω-3 | 1.05 | 0.65 | 1.24 |

The sn-2 fatty acids of the mixed lipids fell within the reference range. However, concerning the composition of sn-1,3 fatty acids, the mixed lipids had a higher content of palmitic acid and lower content of oleic acid and linoleic acid. Therefore, the sn-1,3 fatty acid composition of the mixed lipids was regulated by selecting acyl donors and utilizing acidolysis reaction catalyzed by sn-1,3 lipase.

Based on the sn-1,3 fatty acid composition of breast milk lipid, an acidolysis fatty acid equilibrium model was established to predict the substrate ratios and the proportions of free fatty acids that would meet the sn-1,3 fatty acid composition of breast milk lipid. However, as previously shown, the separation of saturated triglycerides from the lipid system after the reaction was completed had an impact on the composition of sn-1,3 fatty acids in the lipids. Therefore, taking into account the 15% palmitic acid in the separated system, if the sn-1,3 fatty acid composition of the product needs to be within the range of breast milk lipid, the first step is to reduce the content of other fatty acids in sn-1,3 position of breast milk lipid by 15%, excluding palmitic acid. Then, the palmitic acid content in the sn-1,3 position should be increased by 15%. The reference range of the resulting sn-1,3 fatty acid composition was shown in Table 35.

TABLE 35

Reference concentration range for sn-1,3 fatty acid mixtures

| Fatty acid (mol %) | sn-1,3 | |
|---|---|---|
| | min | max |
| C6:0 | 0.01 | 0.15 |
| C8:0 | 0.07 | 1.22 |

TABLE 35-continued

| Reference concentration range for sn-1,3 fatty acid mixtures | | |
|---|---|---|
| Fatty acid | sn-1,3 | |
| (mol %) | min | max |
| C10:0 | 0.09 | 2.96 |
| C12:0 | 1.65 | 8.98 |
| C14:0 | 3.30 | 6.13 |
| C16:0 | 4.01 | 14.56 |
| C18:0 | 1.78 | 10.82 |
| C18:1ω-9 | 26.04 | 44.83 |
| C18:2ω-6 | 14.27 | 33.84 |
| C18:3 ω-3 | 0.96 | 1.86 |

Therefore, based on the reference range of sn-1,3 fatty acid composition, the fatty acid balance model through acidolysis reaction could predict the substrate ratios and the proportion of free fatty acids that meet the fatty acid composition at sn-1,3 position in breast milk lipid.

Using the acidolysis fatty acid equilibrium model was possible to calculate the proportions of free fatty acids required to achieve the reference range of sn-1,3 fatty acids in breast milk lipid for different substrate ratios, as shown in Table 36.

TABLE 36

The proportion of various fatty acids required to achieve the reference range of sn-1,3 fatty acids under different substrate ratios

| Fatty acid (mol %) | Mixed lipid sn-1,3 | Substrate ratio (triglyceride: fatty acid, mol/mol) | | | | | | | |
|---|---|---|---|---|---|---|---|---|---|
| | | 1:6 | | 1:8 | | 1:10 | | 1:12 | |
| | | min. | max. | min. | max. | min. | max. | min. | max. |
| C6:0 | 0.06 | −0.01 | 0.18 | 0.00 | 0.17 | 0.00 | 0.17 | 0.00 | 0.17 |
| C8:0 | 0.74 | −0.15 | 1.38 | −0.10 | 1.34 | −0.06 | 1.32 | −0.04 | 1.30 |
| C10:0 | 0.62 | −0.09 | 3.74 | −0.04 | 3.55 | −0.02 | 3.43 | 0.00 | 3.35 |
| C12:0 | 3.05 | 1.18 | 10.96 | 1.30 | 10.46 | 1.37 | 10.17 | 1.42 | 9.97 |
| C14:0 | 3.74 | 3.15 | 6.93 | 3.19 | 6.73 | 3.21 | 6.61 | 3.23 | 6.53 |
| C16:0 | 66.52 | −16.83 | 0.76 | −11.62 | 2.57 | −8.49 | 4.17 | −6.41 | 5.90 |
| C18:0 | 5.17 | 0.65 | 12.70 | 0.93 | 12.23 | 1.10 | 11.95 | 1.22 | 11.76 |
| C18:1ω-9 | 16.32 | 29.28 | 54.33 | 28.47 | 51.96 | 27.98 | 50.53 | 27.66 | 49.58 |
| C18:2ω-6 | 2.55 | 18.18 | 44.27 | 17.20 | 41.66 | 16.61 | 40.10 | 16.22 | 39.06 |
| C18:3 ω-3 | 1.24 | 0.87 | 2.48 | 0.89 | 2.33 | 0.90 | 2.23 | 0.91 | 2.17 |

Through model prediction, it was found that the main fatty acid in the fatty acid composition of the product after limiting the acidolysis reaction was palmitic acid. Lower substrate ratios made it difficult to find free fatty acids that met the conditions. On the other hand, higher substrate ratios increased the difficulty of subsequent deacidification and also led to higher production costs. Thus, the substrate molar ratio of 1:8 was chosen for the acidolysis reaction. Therefore, based on the model prediction results, the acyl donors were selected, and after the reaction was completed, the system was further subjected to fractionation and extraction to remove high-saturation triglycerides, thereby obtaining a product consistent with breast milk lipid.

By selecting the optimized acyl donors, a mixture of coconut oil rich in medium-chain fatty acids, sunflower seed oil fatty acids rich in linoleic acid, tea seed oil fatty acids rich in oleic acid, and flaxseed oil fatty acids rich in linolenic acid were chosen as the acyl donors. According to the reference range of sn-1,3 fatty acids and the fatty acid blending model, an inequality was established.

Sunflower oil was set as X1, tea seed oil was set as X2, coconut oil was set as X3, and flaxseed oil was set as X4.

Based on the predicted range of fatty acids in the model, an inequality was established as follows:

$$0.62X3/(X1+X2+X3+X4) \leq 0.17 \qquad \text{sn-1,3C6:0}$$

$$5.71X3/(X1+X2+X3+X4) \leq 1.34 \qquad \text{sn-1,3C8:0}$$

$$5.56X3/(X1+X2+X3+X4) \leq 3.55 \qquad \text{sn-1,3C10:0}$$

$$1.3 \leq 47.12X3/(X1+X2+X3+X4) \leq 10.46 \qquad \text{sn-1,3C12:0}$$

$$3.19 \leq 19.3X3/(X1+X2+X3+X4) \leq 6.73 \qquad \text{sn-1,3C14:0}$$

$$(6.53X1+8.72X2+9.92X3+5.32X4)/(X1+X2+X3+X4) \leq 2.57 \qquad \text{sn-1,3C16:0}$$

$$0.93 \leq (3.44X1+3.68X2+3X3+3.66X4)/(X1+X2+X3+X4) \leq 12.23 \qquad \text{sn-1,3C18:0}$$

$$28.47 \leq (31.25X1+65.71X2+7.03X3+19.45X4)/(X1+X2+X3+X4) \leq 51.96 \qquad \text{sn-1,3C18:1}$$

$$17.2 \leq (58.78X1+21.89X2+1.74X3+16.23X4)/(X1+X2+X3+X4) \leq 41.66 \qquad \text{sn-1,3C18:2}$$

$$0.89 \leq 54.30X4/(X1+X2+X3+X4) \leq 2.33 \qquad \text{sn-1,3C18:3}$$

Through calculations, when the ratio of sunflower seed oil to tea seed oil to coconut oil to flaxseed oil is 1:2:0.8:0.15, the main fatty acids in the mixed fatty acids were all within the desired range. The composition of the mixed fatty acids was shown in Table 37:

TABLE 37

| The composition of the mixed fatty acids | |
|---|---|
| Fatty acid (mol %) | Content |
| C6:0 | 0.13 |
| C8:0 | 1.16 |
| C10:0 | 1.13 |
| C12:0 | 9.54 |
| C14:0 | 3.91 |
| C16:0 | 6.76 |
| C18:0 | 3.48 |
| C18:1ω-9 | 44.86 |
| C18:2ω-6 | 26.93 |
| C18:3 ω-3 | 2.06 |

According to the prediction model, the substrate molar ratio was 1:8 (triglycerides/fatty acids), and the mixed fatty acid composition has sunflower seed oil: rapeseed oil: coconut oil:flaxseed oil=1:2:0.8:0.15. Using Lipase DF as a catalyze. The reaction was carried out at a temperature of 55° C. for 10 hours with an enzyme dosage of 12%, and a stirring rate of 800 revolutions per minute. The fatty acid composition and distribution of the obtained product were shown in Table 38:

TABLE 38

The fatty acid characteristics of the acidolysis product

|  | Total | sn-2 | sn-1,3 |
|---|---|---|---|
| C6:0 | 0.06 | 0.03 | 0.08 |
| C8:0 | 0.63 | 0.11 | 0.89 |
| C10:0 | 0.61 | 0.28 | 0.77 |
| C12:0 | 6.76 | 6.75 | 6.76 |
| C14:0 | 2.70 | 1.37 | 3.36 |
| C16:0 | 35.32 | 48.85 | 28.55 |
| C18:0 | 3.64 | 4.29 | 3.31 |
| C18:1ω-9 | 31.78 | 25.05 | 35.14 |
| C18:2ω-6 | 17.09 | 12.43 | 19.42 |
| C18:3 ω-3 | 1.43 | 0.84 | 1.72 |

After the reaction was completed, the acidolysis product was subjected to programmed fractionation crystallization, aiming to remove saturated triglycerides and some glycerides from the lipids.

Because most of the glycerides in the reaction system contained palmitic acid, their melting points were relatively high. As a result, during the fractionation and extraction process, they crystallized and were removed along with high-melting triglycerides. Some glycerides were prone to form glycerides and chloropropanol esters at high temperatures. Therefore, reducing the content of these glycerides was essential to improve the safety performance of the product.

Meanwhile, due to the relatively high content of free fatty acids, the free fatty acids acted as solvents and dissolved triglycerides and partial glycerides in the system. Therefore, by controlling the temperature, the separation of saturated and unsaturated triglycerides in the system could be better achieved.

The conditions for programmed fractionation and extraction: the mixed lipids were heated to 70° C. and kept at this temperature for 20 minutes until completely dissolved. After that, the acidolysis product was cooled down to 35° C. at a rate of 10 degrees/hour and left to crystallize for 6 hours, allowing the formation of crystal nuclei of palmitic acid and tripalmitin glycerides. The temperature was then reduced to 24° C. at a rate of 10 degrees/hour and left to crystallize for 12 hours, while maintaining the rotation speed at 40 rpm to facilitate the crystallization of partial glycerides containing two palmitic acids. After that, the solid fats in the lipids were removed through filtration or centrifugation, and the liquid oil was obtained. Before and after fractionation and extraction, the content of partial glycerides (monoglycerides and diglycerides) in the system and the yield of liquid triglycerides were shown in Table 39:

TABLE 39

The glycerides content and product yield in the system before and after fractionation and extraction process

| Glyceride (%) | Before fractionation and extraction | After fractionation and extraction |
|---|---|---|
| triglyceride | 89.03 | 96.92 |
| diglyceride | 8.46 | 2.36 |
| monoglyceride | 2.51 | 0.72 |
| Yield of liquid triglycerides | 79.8% | |

The liquid oil was subjected to vacuum distillation to remove fatty acids and obtain the final product. The fatty acid composition was as shown in Table 40.

TABLE 40

The fatty acid profile of the separated liquid oil

| Fatty acid (mol %) | Total | sn-2 | sn-1,3 |
|---|---|---|---|
| C6:0 | 0.07 | 0.04 | 0.09 |
| C8:0 | 0.68 | 0.12 | 0.96 |
| C10:0 | 0.63 | 0.30 | 0.80 |
| C12:0 | 6.58 | 5.87 | 6.94 |
| C14:0 | 2.92 | 1.29 | 3.74 |
| C16:0 | 28.46 | 51.48 | 16.94 |
| C18:0 | 2.68 | 1.36 | 3.34 |
| C18:1ω-9 | 36.21 | 24.31 | 42.16 |
| C18:2ω-6 | 20.05 | 14.26 | 22.95 |
| C18:3ω-3 | 1.71 | 0.97 | 2.08 |
| % sn-2 PA* | 60.3% | | |
| C18:2/C18:3 | 11.73% | | |

*% sn-2PA represents the proportion of sn-2 palmitic acid to the total palmitic acid. The calculation formula is as follows: sn-2 palmitic acid/(3 × total palmitic acid)) × 100%

The final product was determined to have a content of glycerides at 0.22 mg/kg, chloropropanol esters at 0.43 mg/kg, and trans fatty acids at 0.15 g/100 g.

The triglyceride composition of the obtained product was shown in Table 41.

TABLE 41

Triglyceride composition of the product (%)

| Triglyceride | Content | Triglyceride | Content |
|---|---|---|---|
| CaLaLa | 0.01 | MOL | 0.84 |
| BuOP | 0.00 | LaOO | 4.48 |
| MLaCa | 0.01 | POLa | 5.87 |
| CaLaL | 0.04 | POL | 14.46 |
| CaLaO | 0.12 | PPL | 5.18 |
| LaLaM | 0.05 | MPO | 2.19 |
| LaLaO | 0.94 | OOO | 8.59 |
| CaPL | 0.32 | POO | 22.58 |
| LLL | 1.24 | PPO | 9.42 |
| LaOL | 4.07 | SOO | 0.81 |
| CaPO | 0.59 | POS | 2.12 |
| OLL | 4.96 | PPS | 0.74 |
| PLL | 7.08 | PPP | 3.30 |
| C52 triglyceride | | 46.24 | |

The content of C52 triglycerides in the obtained product was 46.24%, the content of % sn-2 PA in the obtained product was 60.3%, the content of tripalmitin in the obtained product was 3.30%. All three components meet the requirements of the national safety standard GB30604-2015 "Food Nutrient Fortifier 1,3-Dioleoyl-2-palmitic acid triglyceride" (% sn-2 PA ≥52%, C52 triglycerides ≥40%, tripalmitin <10%).

After evaluating the similarity through a similarity model, the mixed lipids and ester exchange products were found to have the following similarity to human breast milk lipid in terms of fatty acid, sn-2 fatty acid, and polyunsaturated fatty acid and triglyceride composition, as shown in the Table 42:

TABLE 42

| Similarity between product and breast milk lipid | |
| --- | --- |
| Similarity (%) | Acidolysis product |
| $G_{FA}$ | 100 |
| $G_{sn-2FA}$ | 92.7 |
| $G_{TAG}$ | 90.6 |

By comparing the similarity between the acidolysis product and the breast milk lipid using the evaluation model, it was found that the resulting product not only exhibited a matching fatty acid composition and distribution as in the breast milk lipid, but also showed a high degree of similarity in triglyceride composition.

Comparative Example 1

Following the conditions of Examples 1, 2, and 3, the lipid blending and acid-hydrolysis were performed. After the acidolysis reaction, fatty acids were directly removed through vacuum distillation, and the product was obtained by dry fractionation and extraction to eliminate saturated triglycerides. For the grease yield of liquid oil in comparative example 1, 2 and 3, the glyceride composition, the contents of glycidol ester and chloropropanol ester in the product were shown in the Table 43.

TABLE 43

| Main indicators of products obtained by comparative example 1 | | | |
| --- | --- | --- | --- |
| | Comparative example | | |
| | Comparative example 1 | Comparative example 2 | Comparative example 3 |
| % sn-2 PA* | 55.63 | 60.32 | 51.51 |
| C52 triglyceride (%) | 42.52 | 44.66 | 38.34 |
| $G_{FA}$ | 94.5 | 93.7 | 96.4 |
| $G_{sn-2FA}$ | 83.3 | 84.6 | 75.7 |
| $G_{TAG}$ | 80.1 | 76.7 | 72.6 |
| Yield of liquid triglyceride (%) | 61.63 | 63.28 | 66.5 |
| Triglyceride content (%) | 94.73 | 94.85 | 94.21 |
| Diglyceride content (%) | 4.38 | 4.33 | 4.75 |
| Monoglyceride content (%) | 0.89 | 0.82 | 1.04 |

TABLE 43-continued

| Main indicators of products obtained by comparative example 1 | | | |
| --- | --- | --- | --- |
| | Comparative example | | |
| | Comparative example 1 | Comparative example 2 | Comparative example 3 |
| Glyceride (mg/kg) | 0.55 | 0.61 | 0.72 |
| Chloropropanol ester (mg/kg) | 0.81 | 0.87 | 1.18 |

*% sn-2PA represents the proportion of sn-2 palmitic acid to the total palmitic acid. The calculation formula is as follows: sn-2 palmitic acid/(3 × total palmitic acid)) × 100%

Samples of 15 g each from Examples 1, 2, and 3, as well as Comparative examples 1, 2, and 3, were subjected to accelerated oxidation tests at 60° C. The peroxide values (meq/kg) of the samples were measured at 0, 24, 48, and 72 hours to compare the oxidative stability of the two types of lipids. The results were shown in Table 44.

TABLE 44

| Oxidation stability test | | | | | | |
| --- | --- | --- | --- | --- | --- | --- |
| | Peroxide value (meq/kg) | | | | | |
| Time (h) | Example 1 | Example 2 | Example 3 | Comparative example 1 | Comparative example 2 | Comparative example 3 |
| 0 | 1.3 | 1.0 | 1.4 | 1.5 | 1.4 | 1.6 |
| 24 | 3.3 | 3.2 | 3.7 | 4.1 | 4.9 | 5.2 |
| 48 | 6.1 | 6.5 | 7.8 | 8.3 | 9.2 | 9.5 |
| 72 | 10.8 | 10.4 | 12.9 | 14.7 | 14.1 | 16.6 |

In the acidolysis reaction system, due to the higher content of free fatty acids, by employing a fractionation and extraction method involving fatty acids, on the one hand, the fatty acids could act as solvents, increasing the selectivity of triglycerides during the fractionation and extraction process, thereby enhancing the yield of the target triglycerides. At the same time, this approach also avoided the issues of lower product yields associated with dry fractionation and extraction or concerns related to safety and cost that might have arisen from wet fractionation and extraction primarily relying on organic solvents. Meanwhile, a two-stage fractionation and extraction process was adopted. Firstly, high-melting-point palmitic acid was allowed to crystallize with tristearin to form a crystal nucleus. As a result, this process facilitated the crystallization of triglycerides containing two palmitic acids in the subsequent steps, and it also improved the crystallization of some glycerides.

During the acidolysis reaction, the formation of partial glycerides as intermediate products was inevitable. Partial glycerides in the lipid would undergo various side reactions at high temperatures, resulting in an increase in the content of certain harmful substances in the lipid, such as glycerides and chloropropanol esters. At the same time, partial glycerides in the lipid belonged to amphiphilic substances, which formed micelles in the lipids, increasing the water content, and ultimately reducing the oxidative stability of the lipid. Therefore, by removing partial glycerides through certain methods, it would be advantageous to reduce the generation of harmful substances and enhance the oxidative stability of the lipid.

It is worth noting that the foregoing examples are only used for illustration of the technical solutions of the present invention and non-limiting thereto. Though reference is made to preferred examples for detailed illustration of the present invention, a skilled person in the art should understand that the technical solutions provided by the present invention can vary or be substituted by equivalents without departing from the spirit and scope of the technical solutions described herein, which should fall within the scope of the appended claims.

What is claimed is:

1. A method for preparing a structured lipid simulating a composition of triglycerides in breast milk, wherein the method comprises the following steps:

based on fatty acid composition of breast milk lipid, determining a range of required sn-2 fatty acid composition during a lipid blending process and a range of required sn-1,3 fatty acid composition for an acidolysis reaction between a palm stearin and blended fatty acids, and establishing a lipid blending model to determine a molar ratio of selected lipids to the palm stearin, establishing an acidolysis equilibrium model to determine a composition of free fatty acids required for the acidolysis reaction under different substrate ratios, and establishing a fatty acid blending model to determine the proportions of fatty acids from different lipid sources;

performing the acidolysis reaction between the palm stearin and the blended fatty acids under the catalysis of a sn-1,3 lipase, wherein composition of the blended fatty acids is determined by the acidolysis equilibrium model and the fatty acid blending model, and a molar ratio of the palm stearin to the blended fatty acids is determined by the lipid blending model;

after the completion of the acidolysis reaction, performing fractionation and extraction in the presence of free fatty acids to adjust the content of tripalmitin in the acidolysis reaction product and remove a part of the glyceride, and removing the fatty acids via vacuum distillation to obtain a substitute lipid product similar to the breast milk lipid in terms of fatty acid composition and distribution, as well as the triglyceride composition, wherein the lipid blending model is as follows:

$$sn-2FA\,\% = \frac{Y_{1(sn-2)} + \sum_{i=2}^{n} Y_{i(sn-2)}X_i}{1 + \sum_{i=2}^{n} X_i}, \tag{1}$$

wherein sn-2 FA % is the sn-2 fatty acid composition in mixed lipids, Y represents different fatty acids, $Y_{1(sn-2)}$ and $Y_{i(sn-2)}$ are molar percentages of each fatty acid at sn-2 position of the palm stearin and the lipids, respectively, $X_i$ represents a molar ratio of the lipids to the palm stearin; the compositions of total fatty acids and sn-1,3 fatty acids are also obtained, as shown below:

$$FA\,\% = \frac{Y_1 + \sum_{i=2}^{n} Y_i X_i}{1 + \sum_{i=2}^{n} X_i}, \tag{2}$$

$$sn-1.3FA\,\% = \frac{3 \times \left(Y_1 + \sum_{i=2}^{n} Y_i X_i\right) - \left(Y_{1(sn-2)} + \sum_{i=2}^{n} Y_{i(sn-2)}X_i\right)}{2 \times \left(1 + \sum_{i=2}^{n} X_i\right)}, \tag{3}$$

wherein FA % is the fatty acid composition in the mixed lipids, sn-1,3 FA % is the sn-1,3 fatty acid composition in the mixed lipids, $Y_1$ and $Y_i$ are molar percentages of each fatty acid in the palm stearin and the lipids, respectively, wherein the acidolysis equilibrium model is as follows:

the content of Xi fatty acids in the triglycerides sn-1,3 (sn-1/3Xi) at reaction equilibrium is as follows:

$$sn-1/3FA\,\% = \frac{2mM_{sn-1/3Xi} + hM_{Xi}}{\sum_{i=1}^{n} (2mM_{sn-1/3Xi} + hM_{Xi})}, \tag{4}$$

wherein m is the amount of the triglycerides, h is the amount of the fatty acids, n is the type of the fatty acids, Xi represents different fatty acids, $M_{sn-1/-3Xi}$ is a molar percentage of Xi fatty acids on a sn-1,3 position of triglycerides, $MX_i$ is a molar percentage of free fatty acids Xi;

since $$\sum_{i=1}^{n} M_{sn-2Xi} = 1,$$

$$\sum_{i=1}^{n} M_{Xi} = 1, \text{ and therefore}$$

$$\sum_{i=1}^{n} (2mM_{sn-1/3Xi} + hM_{Xi}) = 2m + h,$$

and the acidolysis equilibrium model is further simplified as:

$$sn-1/3FA\,\% = \frac{2mM_{sn-1/3Xi} + hM_{Xi}}{2m + h}, \tag{5}$$

if h/m=S, a molar ratio between the free fatty acids to the triglycerides is S:1, and the content of Xi fatty acids in the triglycerides sn-1,3 at reaction equilibrium is further simplified as:

$$sn-1/3FA\,\% = \frac{2M_{sn-1/3Xi} + SM_{Xi}}{2 + S}, \tag{6}$$

wherein the fatty acid blending model is as follows:

$$FA\,\% = \frac{\sum_{i=2}^{n} Y_i X_i}{\sum_{i=2}^{n} X_i}, \tag{7}$$

wherein $Y_i$ is a molar percentage of each fatty acid in the selected lipids, and $X_i$ is a molar ratio of the selected lipids.

2. The method of claim 1, wherein an acidolysis product of the palm stearin has a maximum removal amount of palmitic acid of 15-25%.

3. The method of claim 1, wherein an edible vegetable oil is selected to regulate the sn-2 fatty acid composition of the palm stearin based on the range of the required sn-2 fatty acid composition, the edible vegetable oil is selected from a group consisting of sunflower oil, soybean oil, tea seed oil, coconut oil, palm kernel oil, and flaxseed oil.

4. The method of claim 1, wherein a fatty acid proportion is calculated based on a fatty acid balance from the acidolysis reaction of the lipids, and one or more of the fatty acids from sunflower seed oil, rapeseed oil, coconut oil, flaxseed oil, tea seed oil, and palm kernel oil are selected as acyl donors for the acidolysis reaction, and the type and proportion of the acyl donors are determined by establishing the fatty acid blending model.

5. The method of claim 1, wherein the acidolysis reaction product is obtained by catalyzing the acidolysis reaction of the palm stearin with mixed fatty acids using a sn-1,3 specific lipase via a packed bed or batch reactor.

6. The method of claim 1, wherein the fractionation and extraction process involves two-stages, wherein a first stage comprises heating the lipid to 60-70° C. for 20-45 minutes, and reducing the lipid to 26-35° C. at a rate of 5-15° C./h for 2-8 hours, so that palmitic acid and tripalmitin crystallize to form crystal nucleus.

7. The method of claim 6, wherein a second stage comprises reducing the lipid to 13-24° C. at the rate of 4-10° C./h and keeping for 4-12 hours to facilitate crystallization of partial glycerides containing two palmitic acids.

\* \* \* \* \*